United States Patent [19]

Seitz et al.

[11] Patent Number: 4,680,384
[45] Date of Patent: Jul. 14, 1987

[54] DYES, THEIR PREPARATION AND USE

[75] Inventors: Karl Seitz, Oberwil; Henri Riat, Arlesheim; Karl Hoegerle, Basel, all of Switzerland

[73] Assignee: Ciba-Geigy Corporation, Ardsley, N.Y.

[21] Appl. No.: 632,558

[22] Filed: Jul. 19, 1984

Related U.S. Application Data

[60] Continuation of Ser. No. 513,121, Jul. 13, 1983, abandoned, which is a continuation of Ser. No. 339,193, Jan. 13, 1982, abandoned, which is a division of Ser. No. 112,979, Jan. 17, 1980, Pat. No. 4,325,869, which is a continuation of Ser. No. 903,632, May 8, 1978, abandoned.

[30] Foreign Application Priority Data

May 9, 1977 [LU] Luxembourg ............... 77286

[51] Int. Cl.[4] ............................................. C09B 45/00
[52] U.S. Cl. ................................... 534/622; 534/632; 534/637; 534/638
[58] Field of Search ............... 534/622, 632, 637, 638

[56] References Cited

U.S. PATENT DOCUMENTS

| | | |
|---|---|---|
| 3,377,335 | 4/1968 | Dürig et al. . |
| 3,463,771 | 8/1969 | Benz et al. . |
| 3,502,642 | 3/1970 | Dussy . |
| 3,585,181 | 6/1971 | Jager et al. . |
| 3,669,951 | 6/1972 | Bien et al. . |
| 3,853,840 | 12/1974 | Schündehütte . |
| 4,325,869 | 4/1982 | Seitz et al. . |

Primary Examiner—Helen M. S. Sneed
Attorney, Agent, or Firm—Edward McC. Roberts; Joseph G. Kolodny

[57] ABSTRACT

Dyes of the formula

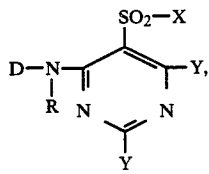

(1)

in which D is the radical of an organic dye, R is hydrogen or a low molecular weight alkyl group, X is an unsubstituted or substituted alklyl or alkenyl radical, one Y is halogen and the other Y is a substituent.

16 Claims, No Drawings

DYES, THEIR PREPARATION AND USE

This is a continuation of application Ser. No. 513,121, filed 7-13-83 now abandoned which is a continuation Ser. No. 339,193 filed 1-13-82, abandoned, which is a division of Ser. No. 112,979 filed 1-17-80 now U.S. Pat. No. 4,325,869 which is a continuation of Ser. No. 903,632 filed 5-8-78 now abandoned.

The present invention relates to dyes of the formula

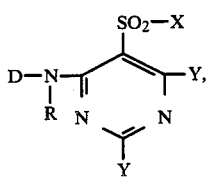
(1)

in which D is the radical of an organic dye, R is hydrogen or a low molecular weight alkyl group, X is an unsubstituted or substituted alkyl or alkenyl radical, one Y is halogen and the other Y is a substituent.

Important sub-groups of the dyes of the formula (1) are:

(a) Dyes in which D, R and X are as defined under formula (1), one Y is halogen and the other Y is halogen, a substituted or unsubstituted amino group or a free or etherified hydroxyl or mercapto group.

(b) Dyes in which D, R and X are as defined under formula (1), one Y is halogen and the other Y is halogen or a substituted or unsubstituted amino, alkoxy, aryloxy, alkylthio or arylthio group.

(c) Dyes in which D and X are as defined under formula (1), R is hydrogen or alkyl having 1 to 4 carbon atoms and both Y are halogen and can be identical or different.

(d) Dyes in which D, R and Y are as defined under (c), and X is an alkyl radical which can be substituted by halogen, alkoxy or aryl.

The following are preferred:

(e) Dyes in which D, R and X are as defined under (c) and both Y are halogen and are identical, and (f) Dyes in which D and R are as defined under (e), X is low molecular weight alkyl and both Y are chlorine atoms.

The following are particularly preferred:

(g) Dyes of the formula

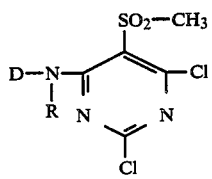
(2)

in which D and R are as defined under (f), and especially (h) dyes in which D is as defined under (g) and R is hydrogen.

(i) Further preferred dyes are those of the formula

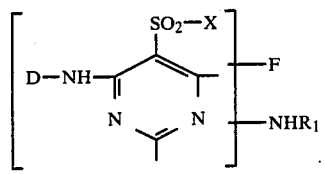
(2a)

in which D and X are as defined under formula (1) and $R_1$ is hydrogen or an unsubstituted or substituted alkyl, cycloalkyl, aralkyl or aryl radical.

In the dyes of the formula (1), the radical D is especially the radical of a dye of the monoazo or polyazo, metal complex, anthraquinone, phthalocyanine, formazane, azomethine, nitroaryl, dioxazine, phenazine or stilbene series.

Preferably, the radical D contains groups which confer solubility in water, especially sulphonic acid groups.

A preferred category comprises dyes of the formula (1), in which D is the radical of a monoazo or disazo dye.

An important sub-group comprises the dyes of the formula

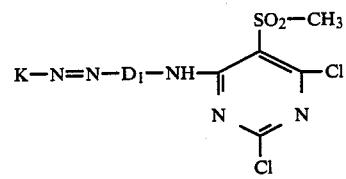
(3)

in which $D_1$ is the radical of a diazo component of the benzene or naphthalene series and K is the radical of a coupling component of the benzene or naphthalene series or of the heterocyclic series.

When the substituent R in the formula (1) is a low molecular weight alkyl group, it is an alkyl group having 1 to 6, preferably 1 to 4, carbon atoms, which can be substituted, for example by halogen, hydroxyl and other substituents. Examples of R are methyl, ethyl, propyl, isopropyl, butyl, isobutyl, sec.-butyl, tert.-butyl and $\beta$-hydroxyethyl.

Alkyl radicals X are straight-chain and branched alkyl radicals, for example methyl, ethyl, propyl, n-butyl, isopropyl and the like, and also unsaturated radicals. The radical X can be substituted further. In particular, X is an alkyl radical which can be substituted by halogen, alkoxy or aryl. In this preferred embodiment, if X is an alkyl radical, halogen substituents are fluorine, chlorine and bromine, and alkoxy substituents are straight-chain or branched alkoxy groups having 1 to 12 carbon atoms. Examples of such substituted radicals X are chloromethyl, $\beta$-chloroethyl, trifluoromethyl, perfluoro-n-butyl, $C_1$-$C_{12}$-alkoxy-methyl, benzyl, -phenetyl, vinyl and allyl.

Examples of unsubstituted radicals X are methyl, ethyl, propyl, isopropyl, butyl, isobutyl, sec.-butyl, tert.-butyl, n-hexyl and cyclohexyl.

Preferably, X is low molecular weight alkyl, in which case, as for R above, it is an alkyl radical having 1 to 6 carbon atoms, especially 1 to 4 carbon atoms, and in particular methyl.

Halogen Y is fluorine, chlorine or bromine.

A substituent Y is, for example, an alkyl radical, such as methyl or ethyl, a substituted alkyl radical, such as mono-, di- or tri-chloro- or -bromo-methyl, an alkenyl radical, such as vinyl, halogenovinyl and allyl, a nitro, cyano or carboxyl group, a carboxylic acid ester group, an unsubstituted or N-substituted carboxamide or sulphonamide group, the sulpho or a sulphonic acid ester group. Preferably, a substituent Y is also a detachable radical. In the formula (1), preferably both Y are halogen atoms, which can be identical or different. In particular, both Y are identical halogen atoms.

The dyes of the formula (1) are fibre-reactive, since they contain 1 or 2 detachable radicals in the pyrimidine radical.

Fibre-reactive compounds are compounds which can react with the hydroxyl groups of cellulose or with the amino groups of natural or synthetic polyamides to form covalent chemical bonds.

The preparation of a dye of the formula (1) comprises introducing, into an organic dye of the formula

  (4)

or into its intermediate, at least one group of the formula

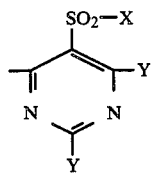  (5)

D, R, X and Y in the formulae (4) and (5) being as defined under formula (1), and, when using a dye intermediate, converting the latter to the desired final dye.

In general, the radical of the formula (5) is introduced into the organic dye of the formula (4) by condensing a dye of the formula (4) with an acylating agent which contains a radical of the formula (5). Acylating agents of this type are compounds of the formula (5) which instead of the open bond contain a detachable radical, for example a halogen atom, in the 4-position of the pyrimidine ring.

In the said acylating agents, a detachable radical Y can be replaced by another detachable radical before or after the condensation with a dye of the formula (4) or with a dye intermediate. For example, a halogen atom can be replaced by another halogen atom by treatment with a halogenating agent. Treatment with a tertiary base, such as trimethylamine, pyridine pr 1,4-diazabicyclo-[2,2,2]-octane, given the corresponding ammonium compound, amd quaternisation with a hydrazine, such as N,N-dimethylhydrazine, gives the corresponding hydrazinium compound. The halogen can be replaced by the sulpho group or a sulphonyl group, for example the 3'-carboxyphenylsulphonyl group and the like, by treatment with a sulphite, for example sodium sulphite, or a sulphinate, respectively. Replacement of chlorine by a nitrile or thiocyanate group, which groups are also reactive, is achievable by reaction with a cyanide, for example potassium cyanide, or a thiocyanate, for example potassium thiocyanate, respectively. Furthermore, treatment with sodium azide or with compounds which contain a reactive methylene group, for example cyanoacetic acid esters, malonic acid esters and acetylacetone, may also be used to replace halogen atoms or other reactive groups by the corresponding radicals.

In particular, halogen atoms Y can be replaced by substituents which are not detachable (reactive) under conventional dyeing conditions. Such substituents are the radicals of compounds which contain easily detachable hydrogen atoms bonded to a hetero-atom, especially a nitrogen, oxygen or sulphur atom, for example water, ammonia and, in particular, aliphatic, aromatic and heterocyclic amino, hydroxyl and mercapto compounds. Accordingly, in this exchange reaction, which can be carried out before or after condensing the above acylating agent with a dye of the formula (4) or a dye intermediate, a halogen atom, for example a chlorine atom, is replaced by a —OH, —NH₂, alkylamino or alkoxy group or the like.

Accordingly, a preferred embodiment of the process according to the invention relates to the preparation of a dye of the formula (1), in which D, R and X are as defined under formula (1), one Y is halogen and the other Y is halogen, a substituted or unsubstituted amino group or a free or etherified hydroxyl or mercapto group, and comprises condensing an organic dye of the formula (4) and a compound of the formula

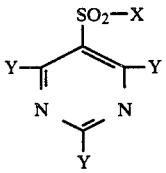  (6)

in which X is as defined under formula (1), two Y are halogen and the third Y is halogen, an unsubstituted or substituted amino group or a free or etherified hydroxyl or mercapto group and, if all three Y are halogen, also, if desired, with an amino, hydroxyl or mercapto compound, in any order, to give a dye of the formula (1).

Since the individual process steps can be carried out in different sequences and in some cases may also be carried out simultaneously, different embodiments of the process are possible. In general, the reaction is carried out in successive steps, the sequence of the simple condensations between individual reactants being in any order.

In accordance with the definition of Y, an amino group is, in the present context and in what follows, not only the H₂N-group, but also a substituted amino group, for example methylamino, diethylamino, β-hydroxyethylamino, phenylamino, sulphophenylamino and naphthylamino, or a cyclic amino group, for example the piperidino or morpholino radical.

[Examples of unsubstituted or substituted amino groups and of free or etherified hydroxyl or mercapto groups are, amongst amino groups, —NH₂, hydroxylamino, hydrazino, phenylhydrazino, sulphophenylhydrazino, methylamino, ethylamino, propylamino, isopropylamino, butylamino, β-methoxyethylamino, γ-methoxypropylamino, N,N-dimethylamino, N,N-diethylamino, N-methyl-N-phenylamino, N-ethyl-N-phenylamino, β-chloroethylamino, β-hydroxyethylamino, γ-hydroxypropylamino, benzylamino, cyclohexylamino, morpholino, piperidino and piperazino and especially aromatic amino groups, such as phenylamino, toluidino, xylidino, chloroanilino, anisidino, phenetidino, 2-, 3- and 4-sulphoanilino, 2,5-disulphoanilino, sulphomethylanilino, N-sulphomethylanilino, 3- and 4-carboxyphenylamino, 2-carboxy-5-sulphophenylamino, 2-carboxy-4-sulphophenylamino, 4-sulphonaphth-1-yl-amino, 3,6-disulphonaphth-1-yl-amino, 3,6,8-trisulphonaphth-1-yl-amino and 3,6,8-trisulphonaphth-1-yl-amino;] amongst free or etherified hydroxyl groups, hydroxyl, methoxy, ethoxy, propoxy, isopropoxy, butoxy, β-methoxyethoxy, β-ethoxyethoxy, γ-methoxypropoxy, γ-ethoxypropoxy, γ-propoxypropoxy, γ-isopropoxypropoxy, phenoxy and naphthoxy; and amongst free or etherified mercapto groups, —SH, methylthio, ethylthio, propylthio, phenylthio and naphthylthio, which can be substituted further, for example by alkyl groups having 1 to 4 carbon atoms, such as methyl, ethyl and propyl, alkoxy groups having 1 to 4 carbon atoms, such as methoxy, ethoxy, propoxy and isopropoxy, acylamino groups having 1 to 6 carbon atoms, such as acetylamino, propionylamino and benzoylamino, amino groups, such as $-NH_2$, methylamino, ethylamino and N,N-dimethylamino, the ureido, hydroxyl, sulpho and carboxyl group, and halogen, such as fluorine, chlorine and bromine.

Preferably, the above preferred embodiment of the process of the invention is used to prepare a dye of the formula (1), in which D, R and X are as defined under formula (1), one Y is halogen and the other Y is halogen or an unsubstituted or substituted amino, alkoxy, aryloxy, alkylthio or arylthio group.

In particular, starting materials of the formulae (4) and (6), in which D and X are as defined under formula (1), R is hydrogen or alkyl having 1 to 4 carbon atoms and all three Y are halogen and are identical or different, are used.

Preferably, starting materials of the formulae (4) and (6), in which D is as defined under formula (1), R is hydrogen or alkyl having 1 to 4 carbon atoms, all three Y are halogen and are identical or different and X is an alkyl radical, which can be substituted by halogen, alkoxy or aryl, are used.

Further preferred starting materials of the formulae (4) and (6) are those in which D and X are as defined under formula (1), R is hydrogen or alkyl having 1 to 4 carbon atoms and all three Y are identical halogen.

In particular, starting materials of the formulae (4) and (6), in which D and R are as defined in the preceding paragraph X is low molecular weight alkyl and all three Y are chlorine atoms, are used.

Preferably, an organic dye of the formula (4), in which D is as defined under formula (1), and R is hydrogen or alkyl having 1 to 4 carbon atoms, is reacted with a compound of the formula

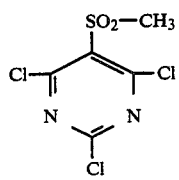  (7)

to give a dye of the formula

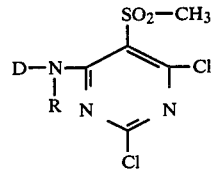  (2)

in which D and R are as defined above. In particular, a dye of the formula (4), in which D is as defined under formula (1) and R is hydrogen, is used as the starting material.

In particular, the dye of the formula (4) is a dye in which the radical D is the radical of a dye of the monoazo or polyazo, metal complex, anthraquinone, phthalocyanine, formazane, azomethine, nitroaryl, dioxazine, phenazine or stilbene series.

Preferably, an organic dye of the formula (4), in which the radical D contains a group which confers solubility in water, or an intermediate of an organic dye of the formula (4), which contains a group which confers solubility in water, is used as the starting material.

A group which confers solubility in water is, in particular, the sulphonic acid group.

The preferred starting material is an organic dye of the formula (4) in which D is a radical of a monoazo or disazo dye.

A preferred embodiment of this type comprises condensing an organic dye of the formula $$K-N=N-D_1-NH_2 \quad (8)$$

in which $D_1$ is the radical of a diazo component of the benzene or naphthalene series and K is the radical of a coupling component of the benzene or naphthalene series or of the heterocyclic series, with a compound of the formula (7).

A modified version of the process described above comprises preparing a dye of the formula (1), in which D is the radical of an organic dye composed of two or more than two components, by condensing a component of a dye of the formula (4), which contains a

group, a compound of the formula (6) and, if desired, an amino, hydroxyl or mercapto compound and, in any stage of the process, reacting the product with the other component (or the remaining components) of the dye of the formula (4), to give a dye of the formula (1).

Examples of such organic dyes composed of two or more than two components are monoazo, disazo, triazo, tetrazo, metal complex, formazane and azomethine dyes.

The modified process described above is especially important for the preparation of a dye of the formula (1), in which D is the radical of an azo dye containing a sulpho group. In this dye, the part of the azo dye radical to which the radical of the formula (5) is bonded directly can be either the radical of the diazo component or the radical of the coupling component. Accordingly, there are two embodiments of the modified process described above.

One of the two embodiments comprises condensing a diazo component, which contains a

group, with a compound of the formula (6), in which two Y are halogen and the third Y is halogen, an unsubstituted or substituted amino group or a free or etherified hydroxyl or mercapto group, diazotising the resulting condensation product and coupling it with a coupling component.

The second embodiment comprises condensing a coupling component, which contains a

group, with a compound of the formula (6), in which two Y are halogen and the third Y is halogen, an unsubstituted or substituted amino group or a free or etherified hydroxyl or mercapto group and coupling the resulting condensation product with a diazotised diazo component.

Using this emobidment of the process of preparation, it is possible to prepare a dye of the formula (1), which contains two reactive radicals of the formula (5), by condensing a diazo component, which contains a

group, with a compound of the formula (6), in which two Y are halogen and the third Y is halogen, an unsubstituted or substituted amino group or a free or etherified hydroxyl or mercapto group, furthermore condensing a coupling component which contains a

group, with a compound of the formula (6), in which two Y are halogen and the third Y is halogen, a substituted or unsubstituted amino group or a free or etherified hydroxyl or mercapto group, and diazotising the condensation product of the diazo component and coupling it with the condensation product of the coupling component, the meaning of R and Y in the condensation product of the diazo component being independent of the meaning of R and Y in the condensation product of the coupling component.

Dyes which contain two or more than two reactive radicals of the formula (5) can also be prepared by condensing a dye of the formula (4) which contains additional

groups in D, with a corresponding amount of the acylating agent, for example of the formula (6), so that two or more than two radicals of the formula (5) are introduced into the dye molecule.

If, as described above, a halogen atom Y in the compound of the formula (6) is replaced by an amino group by condensation with an amine before or after the condensation with the dye of the formula (4) or a dye intermediate, and if the amine used for this purpose is also a dye of the formula (4), a dye which contains two dye radicals, which may be identical or different, bonded to one another by the radical of a 5-alkyl (or aryl)-sulphonyl-pyrimidine.

If a detachable radical Y, for example a halogen atom, in the compound of the formula (6) is replaced, before or after the condensation, with a dye of the formula (4) or (see above) with two dyes of the formula (4), several embodiments of the process result, since the component reactions can be carried out in any order.

Furthermore, it is possible, in a dye of the formula (4) or a dye intermediate, to introduce a group of the formula (5), replace a halogen atom Y, by condensing with an alkylenediamine or arylenediamine, by an alkyl or aryl radical which still contains a free amino group, and condense the free amino group with a fibre-reactive acylating agent, for example an acylating agent containing the radical of the formula (5), so that dyes result which contain two reactive radicals bonded to one another by a colourless alkylene or arylene radical. Here again, various embodiments of the process are possible.

If, as described earlier, the starting material used is not an organic dye of the formula (4) but its components, for example the diazo component and coupling component, the number of possible embodiments (ie. reaction sequences) becomes even greater. However, these can readily be specified on the basis of the description already given.

The condensation of the compound of the formula (6) with the organic dye of the formula (4) or the diazotisable component and/or coupling component containing a

group and, if appropriate, with an amine, water, alcohol, aromatic hydroxy compound or aliphatic or aromatic thiol compound is preferably carried out in aqueous solution or suspension, at a low temperature and at a slightly acid, neutral or slightly alkaline pH, and in such a way that at least one Y remains as a detachable radical in the final dye of the formula (1). If a compound of the formula (6), in which the detachable radicals are halogen atoms, is used as the starting material, the hydrogen fluoride, hydrogen chloride or hydrogen bromide set free during the condensation is advantageously neutralised continuously by adding an aqueous alkali metal hydroxide, alkali metal carbonate or alkali metal bicarbonate.

Starting materials for the production of the dyes of the formula (1) are:
(a) Organic dyes of the formula (4)
1. Monoazo compounds of the formula

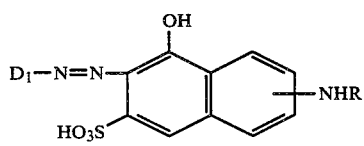

in which $D_1$ is an at most bicyclic aryl radical which contains no azo groups and —NHR groups, R is hydrogen or alkyl and the —NHR group is preferably bonded to the 5-, 6-, 7-or 8-position of the naphthalene nucleus, and which additionally can contain a sulphonic acid group in the 5- or 6-position of the naphthalene nucleus.

$D_1$ can be a radical of the naphthalene or benzene series which does not contain an azo substituent, for example a stilbene, diphenyl, benzthiazolyphenyl or diphenylamino radical. In this class, attention is also drawn to the related dyes in which the —NHR group, instead of being bonded to the naphthalene nucleus, is bonded to a benzoylamino or anilino group which is bonded to the 5-, 6-, 7- or 8-position of the naphthalene nucleus.

Particularly valuable starting dyes are those wherein $D_1$ is a sulphonated phenyl or naphthyl radical, especially those which contain a —$SO_3H$ group in the ortho-position to the azo bond, and the phenyl radical can be further substituted, for example by halogen atoms, such as chlorine, alkyl radicals, such as methyl, acylamino groups, such as acetylamino, and alkoxy radicals, such as methoxy.

2. Disazo compounds of the formula (9), in which $D_1$ is a radical of the azobenzene, azonaphthalene or phenylazonaphthalene series and the naphthalene nucleus is substituted by the —NHR group and, if desired, by sulphonic acid, as in class 1.

3. Monoazo compounds of the formula

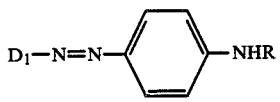

(10)

in which $D_1$ is an at most bicyclic aryl radical, as described in class 1, and preferably a disulphonaphthyl radical or a stilbene radical, R is hydrogen or alkyl, and the benzene nucleus can contain further substituents, such as halogen atoms or alkyl, alkoxy, carboxylic acid, ureido and acylamino groups.

4. Monoazo or disazo compounds of the formula

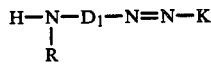

(11)

in which $D_1$ is an arylene radical, for example a radical of the azobenzene, azonaphthalene or phenylazonaphthalene series, or, preferably, an at most bicyclic arylene radical of the benzene or naphthalene series and K is the radical of a naphthol-sulphonic acid or the radical of an enolised or enolisable ketomethylene compound (such as an acetoacetarylide or a 5-pyrazolone) with the OH group in the ortho-position to the azo group, and R is hydrogen or alkyl. $D_1$ represents preferably a radical of the benzene series which contains a sulphonic acid group.

5. Monoazo or disazo compounds of the formula

(12)

in which $D_1$ is a radical of the types defined for $D_1$ in classes 1 and 2 above and $K_1$ is the radical of an enolisable ketomethylene compound (such as an acetoacetarylide or a 5-pyrazolone) with the OH group in the ortho-position to the azo group.

6. The metal complex compounds, for example the copper complexes, chromium complexes and cobalt complexes, of the dyes of the formulae (9) to (12), in which each of $D_1$, K and $K_1$ has the indicated meaning, and furthermore a metallisable group (for example a hydroxyl, lower alkoxy or carboxylic acid group) is present in the ortho-position to the azo group in $D_1$.

EXAMPLES

Class 1:

6-Amino-1-hydroxy-2-(2'-sulphophenylazo)-naphthalene-3-sulphonic acid, 6-methylamino-1-hydroxy-2-(4'-acetylamino-2'-sulphophenylazo)-naphthalene-3-sulphonic acid, 8-amino-1-hydroxy-2-(2'-sulphophenylazo)-naphthalene-3,6-disulphonic acid, 8-amino-1-hydroxy-2-(4'-chloro-2'-sulphophenylazo)-naphthalene-3,5-disulphonic acid, 7-amino-2-(2',5'-disulphophenylazo)-1-hydroxynaphthalene- 3-sulphonic acid, 7-methylamino-2-(2'-sulphophenylazo)-1-hydroxynaphthalene-3-sulphonic acid, 7-methylamino-2-(4'-methoxy-2'-sulphophenylazo)-1-hydroxynaphthalene-3-sulphonic acid, 8-(3'-aminobenzoylamino)-1-hydroxy-2-(2'-sulphophenylazo)-naphthalene-3,6-disulphonic acid, 8-amino-1-hydroxy-2,2'-azonaphthalene-1',3,5',6-tetrasulphonic acid, 8-amino-1-hydroxy-2,2'-azonaphthalene-1',3,5'-trisulphonic acid, 6-amino-1-hydroxy-2,2'-azonaphthalene-1',3,5'-trisulphonic acid, 6-methylamino-1-hydroxy-2,2'-azonaphthalene-1',3,5'-trisulphonic acid, 7-amino-1-hydroxy-2,2'-azonaphthalene-1',3-disulphonic acid, 8-amino-1-hydroxy-2-(4'-hydroxy-3'-carboxyphenylazo)-naphthalene-3,6-disulphonic acid and 6-amino-1-hydroxy-2-(4'-hydroxy-3'-carboxyphenylazo)-naphthalene-3,5-disulphonic acid.

Class 2:

8-Amino-1-hydroxy-2-[4'-(2''-sulphophenylazo)-2'-methoxy-5'-methylphenylazo]-naphthalene-3,6-disulphonic acid, 8-amino-1-hydroxy-2-[4'-(4''-methoxyphenylazo)-2'-carboxyphenylazo]-naphthalene-3,6-disulphonic acid, 8-amino-1-hydroxy-2-[4'-(2''-hydroxy-3'',6''-disulpho-1''-naphthylazo)-2'-carboxyphenylazo]-naphthalene-3,6-disulphonic acid, 4,4'-bis-(8''-amino-1''-hydroxy-3'',6''-disulpho-2''-naphthylazo)-3,3'-dimethoxydiphenyl and 6-amino-1-hydroxy-2-[4'-(2''-sulphophenylazo)-2'-methoxy-5'-methylphenyl-azo]-naphthalene-3,5-disulphonic acid.

Class 3:

2-(4'-Amino-2'-methylphenylazo)-naphthalene-4,8-disulphonic acid, 2-(4'-amino-2'-acetylaminophenylazo)-naphthalene-5,7-disulphonic acid, 4-nitro-4-(4'''-methylaminophenylazo)-stilbene- 2,2'-disulphonic acid, 4-nitro-4'-(4''-amino-2''-methyl-5''methoxyphenylazo)-stilbene-2,2'-disulphonic acid, 4-amino-4'-(4''-methoxyphenylazo)-stilbene-2,2'-disulphonic acid and 4-amino-2-methylazobenzene-2',5'-disulphonic acid.

Class 4:

1-(2',5'-Dichloro-4'-sulphophenyl)-3-methyl-4-(3''-amino-6''-sulphophenylazo)-5-pyrazolone, 1-(4'-sulphophenyl)-3-carboxy-4-(4''-amino-2''-sulphophenylazo)-5-pyrazolone, 1-(2'-methyl-5'-sulphophenyl)-3-methyl-4-(4''-amino-2''-sulphophenylazo)-5-pyrazolone, 1-(2'-sulphophenyl)-3-methyl-4-(3''-amino-6''-sulphophenylazo)-5-pyrazolone, 4-amino-4'-(3''-methyl-1''-phenyl-4''-pyrazol-5''-onylazo)-stilbene-2,2'-disulphonic acid, 4-amino-4'-(2''-hydroxy-3'', 6''-disulpho-1''-naphthylazo)-stilbene-2,2'-disulphonic acid, 8-acetylamino-1-hydroxy-2-(3'-amino-6'-sulphophenylazo)-naphthalene-3, 6-disulphonic acid, 7-(3'-sulphophenylamino)-1-hydroxy-2-(4'-amino-2'-carboxyphenylazo)-naphthalene-3-sulphonic acid, 8- phenylamino-1-hydroxy-2-(4″-amino-2″-sulphophenylazo)-naphthalene-3,6-disulphonic acid and 6-acetylamino-1-hydroxy-2-(5′-amino-2′-sulphophenylazo)-naphthalene-3-sulphonic acid.

Class 5:

1-(3′-Aminophenyl)-3-methyl-4-(2′,5′-disulphophenylazo)-5-pyrazolone, 1-(3′-aminophenyl)-3-carboxy-4-(2′-carboxy-4′-sulphophenylazo)-5-pyrazolone, 4-amino-4′-[3″-methyl-4″-(2‴,5‴-disulphophenylazo)-1″-pyrazpol-5″-onyl]-stilbene-2,2′-disulphonic acid and 1-(3′-aminophenyl)-3-carboxy-4-[4″-(2‴,5‴-disulphophenylazo)-2″-methoxy-5″-methylphenylazo]-5-pyrazolone.

Class 6:

The copper complex of 8-amino-1-hydroxy-2-(2′-hydroxy-5″-sulphophenylazo)-naphthalene-3,6-disulphonic acid, the copper complex of 6-amino-1-hydroxy-2-(2′-hydroxy-5′-sulphophenylazo)-naphthalene-3-sulphonic acid, the copper complex of 6-(amino-1-hydroxy-2-(2′-hydroxy-5′-sulphophenylazo)-naphthalene-3,5-disulphonic acid, the copper complex of 8-amino-1-hydroxy-2-(2′-hydroxy-3′-chloro-5′-sulphophenylazo)-naphthalene-3,6-disulphonic acid, the copper complex of 6-methylamino-1-hydroxy-2-(2′-carboxy-5′-sulphophenylazo)-naphthalene-3-sulphonic acid, the copper complex of 8-amino-1-hydroxy-2-[4′-(2″-sulphophenylazo)-2′-methoxy-5′-methylphenylazo]-naphthalene-3,6-disulphonic acid, the copper complex of 6-amino-1-hydroxy-2-[4′-(2″,5″-disulphophenylazo)-2′-methoxy-5′-methylphenylazo]-naphthalene-3,5-disulphonic acid, the copper complex of 1-(3′-amino-4′-sulphophenyl)-3-methyl-4-[4″-(2‴,5‴-disulphophenylazo)-2″-methoxy-5″-methylphenylazo]-5-pyrazolone, the copper complex of 7-(4′-amino-3′-sulphoanilino)-1-hydroxy-2-[4″-(2‴,5‴-disulphophenylazo)-2″-methoxy-5″-methylphenylazo]-naphthalene-3-sulphonic acid, the copper complex of 6-(4′-amino-3′-sulphoanilino)-1-hydroxy-2-(2″-carboxyphenylazo)-naphthalene-3-sulphonbic acid, the 1,2-chromium complex of 7-amino-6′-nitro-1,2′-dihydroxy-2,1′-azonaphthalene-3,4-disulphonic acid, the 1,2-chromium complex of 6-amino-1-hydroxy-2-(2′-carboxyphenylazo)-naphthalene-3-sulphonic acid, the 1,2-chromium complex of 8-amino-1-hydroxy-2-(4′-nitro-2′-hydroxyphenylazo)-naphthalene-3,6-disulphonic acid, the 1,2-cobalt complex of 6-(4′-amino-3′-sulphoanilino)-1-hydroxy-2-(5″-chloro-2″-hydroxyphenylazo)-naphthalene-3-sulphonic acid, the 1,2-chromium complex of 1-(3′-amino-4′-sulphophenyl)-3-methyl-4-(2″-hydroxy-4″-sulpho-1″-naphthylazo)-5-pyrazolone, the 1,2-chromium complex of 7-(4′-sulphoanilino)-1-hydroxy-2-(4″-amino-2″-carboxyphenylazo)-naphthalene-3-sulphonic acid and the 1,2-chromium complex of 1-(3′-aminophenyl)-3-methyl-4-(4″-nitro-2″-carboxyphenylazo)-5-pyrazolone.

Particularly important azo dyes which can be used for the production of the dyes of the formul (1) are the azo dyes of the formulae

(13)

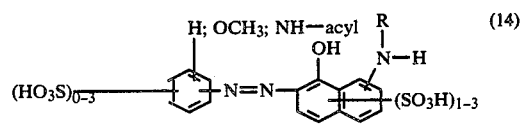

(14)

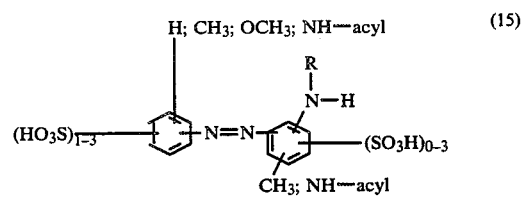

(15)

in which K is the radical of a coupling component of the benzene, naphthalene or heterocyclic series, acyl is a low molecular weight aliphatic acyl radical of not more than 3 carbon atoms or an aromatic radical of not more than 8 carbon atoms and R is as defined for formula (1), and the metal complex azo dyes of the formulae

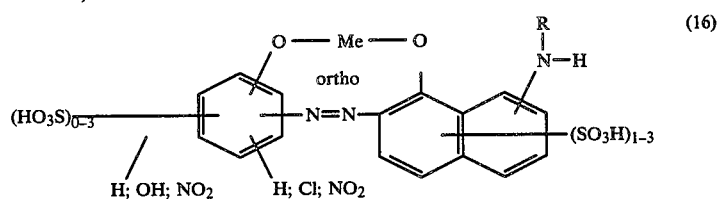

(16)

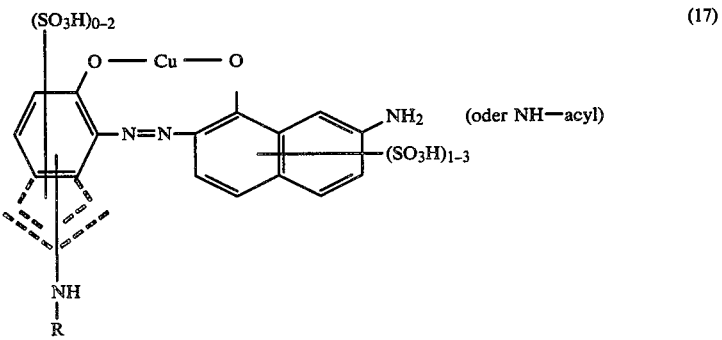

(17)

in which R and acyl are as defined for the formulae (13), (14) and (15) and Me represents Cu, Cr or Co.

7. Anthraquinone compounds which contain a group of the formula —NHR, in which R is hydrogen or alkyl, bonded to an alkylamino or acrylamino group, which is itself bonded to the α-position of the anthraquinone nucleus, in particular of the formula

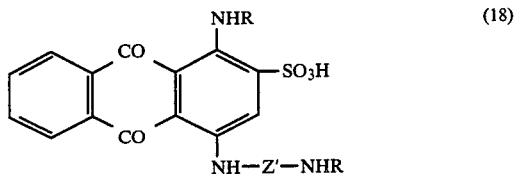 (18)

in which the anthraquinone nucleus can contain an additional sulphonic acid group in the 5-, 6-, 7- or 8-position and Z' is a bridge member which is preferably a divalent radical of the benzene series, for example a phenylene, diphenylene or 4,4'-stilbene or azobenzene radical. Preferably Z' should contain one carboxylic acid or sulphonic acid group for each benzene ring present.

EXAMPLES

1-Amino-4-(4'-aminoanilino)-anthraquinone-2,3'-disulphonic acid and the corresponding 2,3',5-, 2,3',6- and 2,3',7-trisulphonic acids, 1-amino-4-(4''-amino-4'-benzoylaminoaniline)anthraquinone-2,3'-disulphonic acid and the corresponding-2,3',5-trisulphonic acid, 1-amino-4-[4'-(4''-aminophenylazo)-anilino]anthraquinone-2,2'',5-trisulphonic acid, 1-amino-4-(4'-amino-3'-carboxyanilino)-anthraquinone-2,5-disulphonic acid, 1-amino-4-(3'-aminoanilino)-anthraquinone-2,4',5-trisulphonic acid and the corresponding 2,4'-disulphonic acid, 1-amino-4-[4'-(4''-aminophenyl)-anilino]-anthraquinone-2,3'',5-trisulphonic acid, 1-amino-4-(4'-methylamino)-anilinoanthraquinone-2,3'-disulphonic acid and the corresponding 2,3',5-trisulphonic acid, 1-amino-4-(4'-n-butylamino)-anilinoanthraquinone-2,3'-disulphonic acid, 1-amino-4-(4'-methylamino-3'-carboxyanilino)-anthraquinone-2-sulphonic acid, 1-amino-4-(3'-β-hydroxyethylamino)-anilinoanthraquinone-2,5-disulphonic acid, 1-(4'-aminoanilino)-anthraquinone-2,3'-disulphonic acid and 1-amino-4-(4'-amino-2'-methoxyanilino)-anthraquinone-2,3'-disulphonic acid.

8. Phthalocyanine compounds of the formula

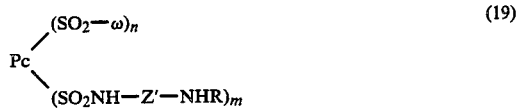 (19)

in which Pc is a phthalocyanine nucleus, preferably copper phthalocyanine, ω is —OH and/or —NH₂, Z' is a bridge member, preferably an aliphatic, cycloaliphatic or aromatic bridge, and each of n and m is 1, 2 or 3 and can be identical or different, provided that the sum of n+m is not greater than 4.

The dye compounds of the phthalocyanine series which can be used as starting materials in the process of the invention are preferably metal-containing phthalocyanines, such as copper phthalocyanines, which contain at least one water-solubilising group, such as a sulphonic acid group, and at least one group of the formula —NHR, in which R is hydrogen or alkyl. The —NHR group or groups can be bonded directly or through a divalent bridge to the benzene rings of the phthalocyanine nucleus, for example through a -phenylene-, —CO-phenylene-, —SO₂-phenylene-, —NH-phenylene-, —S-phenylene-, —O-phenylene-, —CH₂S-phenylene-, —CH₂O-phenylene-, —CH₂-phenylene-, —SCH₂-Phenylene-, —SO₂CH₂-phenylene-, —SO₂NR₁-phenylene-, —CH₂-, —SO₂NR₁-arylene-, —NR₁CO-phenylene-, —NR₁SO₂-phenylene-, —SO₂O-phenylene-, —CH₂NR₁-phenylene-, —CH₂NH-CO-phenylene-, —SO₂NR₁-alkylene-, —CH₂NR₁-alkylene-, —CONR₁-phenylene-, —CONR₁-arylene-, —SO₂- or —CO- bridge. In the above divalent bridge members, R₁ is hydrogen, alkyl or cycloalkyl, arylene is a divalent aromatic radical which is optionally substituted, for example by halogen, alkyl or alkoxy, and in which the terminal bonds may be attached to identical or different nuclei, and alkylene is a divalent aliphatic radical which can include heteroatoms, such as nitrogen, in the chain of atoms for example the radical —CH₂CH₂—NH—CH₂CH₂—.

Examples of such divalent aromatic radicals, which are referred to as arylene, are: aromatic nuclei, for example a benzene, naphthalene, acridine and carbazole nucleus, which can carry further substituents, and radicals of the formula

 (20)

in which the benzene rings can carry further substituents and —D— is a bridging group, for example —CH=CH—, —NH—, —S—, —O—, —SO₂—, —NO=N—, —N=N—, —NH—CO—NH—CO—NH—, —O—CH₂CH₂O—or

 (21)

EXAMPLES 3-(3'-Amino-4'-sulphophenyl)-sulphamyl-copper phthalocyanine-tri- 3-sulphonic acid, di-4-(3'-amino-4'-sulphophenyl)-sulphamyl-copper phthalocyanine-di-4-sulphonic acid, 3-(3'aminophenylsulphamyl)-3-sulphamyl-copper phthalocyanine-di-3-sulphonic acid, copper phthalocyanine-4-N-(4-amino-3-sulphophenyl)sulphonamide-4', 4'',4'''-trisulphonic acid, cobalt phthalocyanine-4,4'-di-N-(4'-amino-4'-sulphophenyl)-carboxamide-4'',4'''-dicarboxylic acid, and copper -4-(4'-amino-3'-sulphobenzoly-phthalocyanine.

Mixtures of phthalocyanines can also be used. For example, a mixture of approximately equal parts of copper phthalocyanine-N-(4-amino-3-sulphophenyl)-sulphonamide-trisulphonic acid and copper phthalocyanine-di-N-(4-amino-3-sulphophenyl)-sulphonamide-disulphonic acid can be used.

9. Nitro dyes of the formula

 (22)

in which D is a naphthalene or benzene nucleus which can be further substituted, the nitrogen atom N is in the ortho-position to the nitro group, Z is hydrogen or an optionally substituted hydrocarbon radical and Q is hydrogen or an organic radical bonded to the nitrogen through a carbon atoms, and in which Q and Z are not both hydrogen, and Q can be bonded to Z, if Z is a hydrocarbon radical, or can be bonded to D in the ortho-position to the nitrogen atom N to form a heterocyclic ring, and which contain at least one grou of the formula —NHR, in which R is hydrogen or alkyl, in particular nitro dyes of the formula

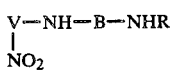
(23)

wherein V and B are monocyclic aryl nuclei and the nitro group in V is in the ortho-position to the NH group.

EXAMPLE

4-Amino-2'-nitro-diphenylamine-3,4'-disulphonic acid.

Metal complexes of formazane dyes of the formula

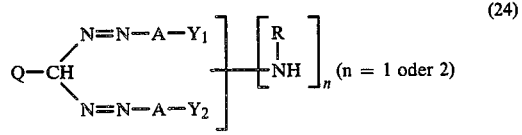
(24)

wherein Q is an organic radical, a nitro or cyano group, A and B are radicals of diazo components of the benzene, naphthalene or heterocyclic series and each of $Y_1$ and $Y_2$ is a substituent which is bonded in the ortho-position to the azo group and which is able to form a complex with a heavy metal, and R has the indicated meaning. The radical Q is especially a radical of the benzene series, such as phenyl or sulphophenyl, or a low molecular weight alkyl radical, such as methyl, a low molecular weight alkanoyl group preferably containing 1 to 4 carbon atoms, a low molecular weight carbalkoxy group, a benzoyl group or a heterocyclic radical, and A and B are preferably phenyl radicals which are substituted by sulpho, sulphonamido or alkylsulphonyl groups. Suitable substituents $Y_1$ and $Y_2$ are above all the hydroxyl and carboxyl groups. Suitable heavy metals are copper, chromium, cobalt and nickel.

EXAMPLES

The copper complex of 2'-carboxy-2"-hydroxy-3"'-amino-1,3,5-triphenylformazane-4', 5",3"'-trisulphonic acid, the copper complex of 2',2"-dihydroxy-3'-amino-5'-methylsulphonyl-1,3,5-triphenyl-3",5", 4"'-trisulphonic acid, the copper complex of 2'-carboxy-4'-amino-2"-hydroxy-1,3,5-triphenylformazane-3",5",2"'-trisulphonic acid, the copper complex of 2'-hydroxy-2"-carboxy-4"'-amino-1,3,5-triphenyliformazane-4',4"-di sulphonic acid, the copper complex of 2',2"-dihydroxy-5"-amino-1,5-diphenyl-3-methylformazane-5',3"-disulphonic acid, the copper complex of 2',2"-dihydroxy-5'-amino-1,3,5-triphenylformazane-3',3",5"-trisulphonic acid, the copper complex of 2'-carboxy-3'-amino-2"-hydroxy-3"'(1""-phenyl-3""-methyl-pyrazol-5""-onyl-4""-azo)-1,3,5-triphenylformazane-3",5",2""5""-tetrasulphonic acid and the nickel complex of 2',2"-dicarboxy-1,5-diphenyl-3-(m-aminobenzoyl)-formazane-4',4"-disulphonic acid.

(b) Compounds of the formula (6)

The compounds of the formula (6) are novel compounds, They are prepared as follows:

1. Barbituric acid is reacted with a compound of the formula

(25)

in which X is an unsubstituted or substituted alkyl or alkenyl radical, and Y is halogen, to give a compound of the formula

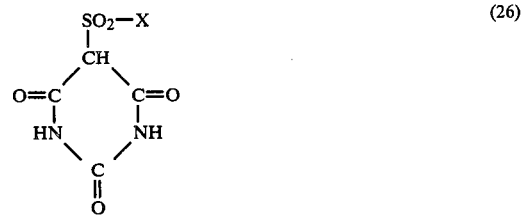
(26)

in which X has the above meaning.

Preferably, a compound of the formula (25) in which Y is halogen and X is an alkyl radical which can be substituted by halogen, alkoxy or aryl, is used as the starting material.

In particular, the starting material used is a compound of the formula (25), in which X is low molecular weight alkyl, and especially methyl. Preferably, barbituric acid is reacted with methanesulphonyl chloride to give the compound of the formula

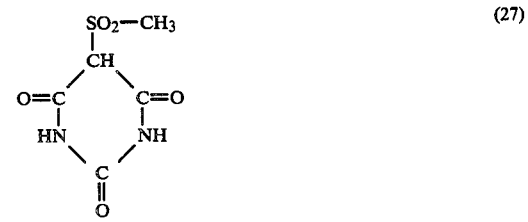
(27)

The reaction of barbituric acid with a compound of the formula (25) is carried out in an aqueous medium or in an organic solvent, in a mixture of organic solvents, or in a mixture of water and one or more organic solvents.

The reaction can also be carried out in a two-phase solvent mixture, in particular comprising water and an organic solvent. In general, the reaction is carried out at temperatures between −20° and 100° C., preferably between 10° and 50° C. The reaction is carried out in an alkaline or strongly alkaline pH range, so that the barbituric acid used as the starting material is in the form of a salt, for example in a pH range of 8 to 14, preferably of 9 to 12. Examples of alkaline reagents used are alkali metal or alkaline earth metal hydroxides, carbonates, bicarbonates and acetates, triethylamine and pyridine.

The free compound of the formula (26) can be obtained from its salt, which has been precipitated from the reaction solution by adding an acid, by treating the salt with a strongly acid ion exchanger. The formulae (26) and (27) are intended also to embrace the other tautomeric forms of these compounds.

2. A compound of the formula (26) is reacted with a halogenating agent to give a compound of the formula

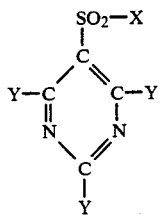

(6)

in which X is an unsubstituted or substituted alkyl or alkenyl radical and the three Y are identical or different halogen atoms.

The starting material used is preferably a compound of the formula (26), in which X is an alkyl radical which can be substituted by halogen, alkoxy or aryl, in particular a compound of the formula (26), in which X is low molecular weight alkyl, especially methyl. Instead of the free compound of the formula (26) it is also possible to use, as the starting material, the crude salt, especially alkali metal salt, of the compound of the formula (26), which salt is obtained in the method of preparation described under 1. The halogenating agent used is preferably a chlorinating agent, for example a chlorine-phosphorus compound, such as phorphorus-(V) oxychloride. The reaction can be carried out in the presence of a catalyst, for example N,N-dimethylaniline or dimethylformamide, used in an amount of 1 to 200%, preferably 100 mol %, based on the amount of barbituric acid employed. The reaction is carried out in an inert organic solvent, such as xylene, chlorobenzene or nitrobenzene, or, for example, in excess phosphorus-(V) oxychloride. Preferably, the compound of the formula (27) is reacted with phosphorus-(V) oxychloride to give the compound of the formula

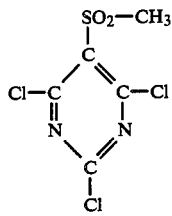

(7)

3. It is possible to react a compound of the formula (6) with further suitable reactants so that one, two or all three halogen atoms Y are replace by other detachable radicals or other substituents which are not detachable. This replacement can, as described above, be carried out before or after condensing a compound of the formula (6) with a dye of the formula (4) or a dye intermediate. There have also been mentioned above other detachable radicals which may be introduced, in place of halogen, into the compound of the formula (6), as well as other compounds which can be condensed with the compound of the formula (6) or its condensation products with a dye of the formula (4) or a dye intermediate, in order to introduce further substituents, for example amino or alkoxy groups or the like, into the 5-alkyl(or aryl)-sulphonylpyrimidine ring.

Examples of sulphohalides of the formula (25) are methanesulphonyl chloride, methanesulphonyl bromide, methanesulphonyl fluoride, chloromethanesulphonyl chloride, ethanesulphonyl chloride, ethanesulphonyl bromide, ethanesulphonyl fluoride, vinylsulphonyl chloride, allylsulphonyl chloride, benzylsulphonyl chloride, phenetylsulphonyl chloride and perfluorobutylsulphonyl fluoride.

Examples of halogenating agents are phosphorus-(V) oxyhalides, such as phosphorus-(V) oxychloride (POCl$_3$) and phosphorus-(V) oxybromide (POBr$_3$). It is also possible to use methylphosphorus-(V) oxydichloride (CH$_3$POCl$_2$), phenylphosphorus-(V) oxydichloride (C$_6$H$_5$POCl$_2$), carbonyl chloride (phosgene, COCl$_2$), thionyl chloride (SOCl$_2$) and even phosphorus pentachloride (PCl$_5$) and sulphuryl chloride (SO$_2$Cl$_2$). If a mixture of halogenating agents, or halogenating agents containing different halogen atoms, for example "mixed" thionyl halides, such as SOClF and SOBrCl, is used, a compound of the formula (6) in which the three Y are different halogen atoms, is obtained. The preferred halogenating agents are chlorinating agents, especially chlorine-phosphorus compounds, above all phosphorus-(V) oxychloride.

4. A compound of the formula (6), in which X is a substituted or unsubstituted alkyl or alkenyl radical, and one or two Y are chlorine atoms and the remaining Y are bromine atoms or fluorine atoms, or all three Y are bromine atoms or fluorine atoms, can also be prepared by reacting a compound of the formula (6), in which all three Y are chlorine atoms, with a brominating agent or a fluorinating agent until one, two or all three chlorine atoms have been replaced by bromine atoms or fluorine atoms.

In this case also, the starting material used is preferably a compound of the formula (6), in which X is an alkyl radical which can be substituted by halogen, alkoxy or aryl, and all three Y are chlorine atoms, and especially a compound of the formula (6), in which X is low molecular weight alkyl and all three Y are chlorine atoms, for example the compound of the formula (7).

Thus, the bromine analogues and fluorine analogues of the compound of the formula (7) are obtained by converting 2,4,6-trichloro-5-methylsulphonyl-pyrimidine into 2,4,6-tribromo-5-methylsulphonyl-pyrimidine by reaction with hydrogen bromide in acetic acid, or by converting 2,4,6-trichloro-5-methylsulphonyl-pyrimidine by reaction with anhydrous hydrogen fluoride or potassium fluorosulphinate or an alkali metal fluoride in a high-boiling aprotic solvent, such as dimethylformamide, dimethylsulphoxide, sulpholan or the like.

The following are examples of 5-alkyl(or aryl)-sulphonyl-pyrimidines of the formula (6) which can be prepared by the processes described above and which can be used as starting materials for the preparation of a dye of the formula (1): 2,4,6-trichloro-5-methylsulphonyl-pyrimidine, 2,4,6-tribromo-5-methylsulphonyl-pyrimidine, 2,4,6-trifluoro-5-methylsulphonyl-pyrimidine, 2,4,6-trichloro-5-ethylsulphonyl-pyrimidine, 2,4,6-trichloro-5-isopropylsulphonyl-pyrimidine, 2,4,6-trichloro-5-n-butylsulphonyl-pyrimidine, 2,4,6-trichloro-5-chloromethylsulphonyl-pyrimidine, 2,4,6-trichloro-5-β-chloroethylsulphonyl-pyrimidine, 2,4,6-trichloro-5-trifluoromethylsulfonyl-pyrimidine, 2,4,6-trichloro-5-perfluorobutylsulphonyl-pyrimidine, 2,4,6-trichloro-5-ethoxymethylsulphonyl-pyrimidine, 2,4,6-trifluoro-5-ethoxyethylsulphonyl-pyrimidine, 2,4,6-tribromo-5-isopropoxymethylsulphonyl-pyrimidine, 2,4,6-trichloro-5-benzylsulphonylpyrimidine, 2,4,6-trimbromo-5-benzylsulphonyl-pyrimidine, 2,4,6-trifluoro-5-benzylsulphonyl-pyrimidine, 2,4,6-trichloro-5-phenetylsulphonyl-pyrimidine, 2,4-dichloro-6-bromo-5-methylsulphonyl-pyrimidine, 2,4-dichloro-6-fluoro-5-methylsulphonylpyrimidine, 2-chloro-4,6-difluoro-5-methylsulphonylpyrimidine, 2-chloro-4,6-dibromo-5-methylsulphonylpyrimidine, 2-bromo-4,6-difluoro-5-methylsulphonylpyrimidine and 2-chloro-4,6-difluoro-5-ethylsulphonylpyrimidine.

(c) Amino, hydroxy and mercapto compounds

Ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxyethylamine, hydroxypropylamine, aminoethanesulphonic acid, β-sulphatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- and 4-acetylaminoaniline, o-, m- and p-nitroaniline, o-, m- and p-aminophenol, 2-methyl-4-nitroaniline, 2-methyl-5-nitroaniline, 2,5-dimethoxyaniline, 3-methyl-4-nitroaniline, 2-nitro-4-methylaniline, 3-nitro-4-methylaniline, o-, m- and p-phenylenediamine, 3-amino-4-methylaniline, 4-amino-3-methylaniline, 2-amino-4-methylaniline, o-, m- and p-anisidine, o-, m- and p-phenetidine, 1-naphthylamine, 2-naphthylamine, 1,4-diaminonaphthalene, 1,5-diaminonaphthalene, 2-amino-1-hydroxy-naphthalene, 1-amino-4-hydroxy-naphthalene, 1-amino-8-hydroxynaphthalene, 1-amino-2-hydroxy-naphthalene, 1-amino-7-hydroxy-naphthalene, orthanilic acid, metanilic acid, sulphanilic acid, aniline-2,4-disulphonic acid, aniline-2,5-disulphonic acid, anthranilic acid, m- and p-aminobenzoic acid, 2-aminotoluene-4-sulphonic acid, 2-amino-toluene-5-sulphonic acid, p-amino-salicylic acid, 1-amino-4-carboxy-benzene-3-sulphonic acid, 1-amino-2-carboxy-benzene-5-sulphonic acid, 1-amino-5-carboxybenzene-2-sulphonic acid, 1-naphthylamine-2-, -3-, -4-, -5-, -6-, -7- and -8-sulphonic acid, 2-naphthylamine-1-, -3-, -4-, -5-, -6-, -7- and -8-sulphonic acid, 1-naphthylamine-2,4-, -2,5-, -2,7-, -2,8-, -3,5-, -3,6-, -3,7-, -3,8-, -4,6-, -4,7-, -4,8- and -5,8-disulphonic acid, 2-naphthylamine-1,5-, -1,6-, -1,7-, -3,6-, -3,7-, -4,7-, -4,8-, -5,7- and -6,8-disulphonic acid, 1-naphthylamine-2,4,6-, -2,4,7-, -2,5,7-, -3,5,7-, -3,6,8- and -4,6,8-trisulphonic acid, 2-naphthylamine-1,3,7-, -1,5,7-, -3,5,7-, -3,6,7-, -3,6,8- and -4,6,8-trisulphonic acid 2-, 3- and 4-aminopyridine, 2-amino-benzthiazole, 5-, 6- and 8-aminoquinoline, 2amino-pyrimidine, morpholine, piperidine, piperazine, water, methanol, ethanol, propanol, isopropanol, n-butanol, isobutanol, sec.-butanol, tert.-butanol, hexanol, cyclohexanol, β-methoxy-ethanol, β-ethoxy-ethanol, γ-methoxy-propanol, γ-ethoxypropanol, β-ethoxy-β-ethoxy-ethanol, glycolic acid, phenol, o-, m- and p-chlorophenol, o-, m- and p-nitrophenol, o-, m- and p-hydroxybenzoic acid, o-, m- and p-phenolsulphonic acid, phenol-2,4-disulphonic acid, α-naphthol, β-naphthol, 1-hydroxynaphthalene-8-sulphonic acid, 2-hydroxynaphthalene-1-sulphonic acid, 1-hydroxynaphthalene-5-sulphonic acid, 1-hydroxynaphthalene-4-sulphonic acid, 1-hydroxynaphthalene-6- or -7-sulphonic acid, 2-hydroxynaphthalene-6-, -7- or -8-sulphonic acid, 2-hydroxynaphthalene-4-sulphonic acid, 2-hydroxynaphthalene-4,8- or -6,8-disulphonic acid, 1-hydroxynaphthalene-4,8-disulphonic acid, 2-hydroxynaphthalene-3,6-disulphonic acid, methanethiol, ethanethiol, propanethiol, isopropanethiol, n-butanethiol, thioglycolic acid, thiourea, thiophenol, α-thionaphthol and β-thionaphthol.

In preparing the preferred dyes of the formula (1), in which D is the radical of an azo dye, especially of a monoazo or disazo dye, the diazotisation of the intermediate containing a diazotisable amino group is as a rule carried out by treatment with nitrous acid in aqueous mineral acid solution at a low temperature whilst the coupling is carried out at a weakly acid, neutral or weakly alkaline pH value.

The following are diazotisable aromatic amines, and compounds capable of coupling, which can also be used in the modified processes described above (where components of the organic dye of the formula (4) are used as starting materials) for the preparation of a dye of the formula (1), in which D is the radical of an azo dye:

Diazo components

Aniline, o-, m- and p-toluidine, o-, m- and p-anisidine, o-, m- and p-chloroaniline, 2,5-dichloroaniline, α- and β-naphthylamine, 2,5-dimethylaniline, 5-nitro-2-aminoanisole, 4-aminodiphenyl, aniline-2-, -3- and -4-carboxylic acid, 2-aminodiphenyl ether, 2-, 3- and 4-aminobenzenesulphonamide and 2-, 3- and 4-aminobenzenesulphonic acid monomethylamide, monoethylamide, dimethylamide and diethylamide, dehydrothio-p-toluidinemonosulphonic acid or dehydrothio-p-toluidinesulphonic acid, aniline-2-, -3- and -4-sulphonic acid, aniline-2,5-disulphonic acid, 2,4-dimethylaniline-6-sulphonic acid, 3-aminobenzotrifluoride-4-sulphonic acid, 4-chloro-5-methylaniline-2-sulphonic acid, 5-chloro-4-methylaniline-2-sulphonic acid, 3-acetylaminoaniline-6-sulphonic acid, 4-acetylaminoaniline-2-sulphonic acid, 4-chloroaniline-2-sulphonic acid, 3,4-dichloroaniline-6-sulphonic acid, 4-methylaniline-2-sulphonic acid, 3-methylaniline-6-sulphonic acid, 2,4-dimethoxyaniline-6-sulphonic acid, 4-methoxyaniline-2-sulphonic acid, 5-methoxyaniline-2-sulphonic acid, 2,5-dichloroaniline-4-sulphonic acid, 2-naphthylamine-4,8- and -6,8-disulphonic acid, 1-naphthylamine-2-, -4-, -5-, -6- and -7-monosulphonic acid, 1-naphthylamine-3,6-disulphonic acid, 2-naphthylamine-3,6- and -5,7-disulphonic acid, 2-naphthylamine-3,6,8-trisulphonic acid, m- and p-nitroaniline, 4-nitroaniline-2-sulphonic acid, 3-nitroaniline-6-sulphonic acid, m- and p-aminoacetanilide and 4-amino-2-acetylaminotoluene-5-sulphonic acid.

Coupling components

Phenol-4-sulphonic acid, β-naphthol, 2-naphthol-6- and -7-sulphonic acid, 2-naphthol-3,6- and -6,8-disulphonic acid, 1-naphthol-4-sulphonic acid, 1-phenyl-3-methyl-5-pyrazolone, 1-(4'-sulphophenyl)-3-methyl-5-pyrazolone, 1-(2',5'-dichloro-4'-sulphophenyl)-3-methyl-5-pyrazolone, 3-aminocarbonyl-4-methyl-6-hydroxy-2-pyridone, 1-ethyl-3-cyano- and -3-chloro-4-methyl-6-hydroxy-2-pyridone, 1-ethyl-3-sulphomethyl-4-methyl-6-hydroxy-2-pyridone, 2,4,6-triamino-3-cyanopyridine, 2-(3'-sulphophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 2-benzoylamino-5-naphthol-7-sulphonic acid, 1-benzoylamino-8-naphthol-3,6- and -4,6-disulphonic acid, phenol, p-cresol, acetoacetanilide and acetoacet-2-methoxyaniline-5-sulphonic acid, 1-(4'-sulphophenyl)-5-pyrazolone-3-carboxylic acid, 3-methyl-5-pyrazolone, 4-hydroxy-2-quinolone, 8-acetylamino-1-naphthol-3-sulphonic acid, 2-aminonaphthalene-5,7-disulphonic acid and 1-naphthol-4,6- and -4,7-disulphonic acid.

German Offenlegungsschriften Nos. 2,113,298 and 2,208,972, which relate to particular reactive dyes, list 2,4,6-trifluoro-5-methylsulphonylpyrimidine amongst a plurality of possible reactive components. However, its preparation is not described. Furthermore, the said German Offenlegungsschriften do not describe dyes which contain a monohalogeno- or dihalogeno-5-methyl(or alkyl)-sulphonylpyrimidyl radical as the reactive radical.

The fibre-reactive dyes of the formula (1) are novel compounds which are distinguished by high reactivity and a high degree of fixing.

They may be used for dyeing and printing very diverse materials, such as silk, leather, wool, high molecular weight polyamide fibres and high molecular weight polyurethanes, but especially cellulose-containing materials having a fibrous structure, such as linen, cellulose, regenerated cellulose and especially cotton. They may be used both in the exhaustion process and in the pad-dyeing process, in which the goods are impregnated with an aqueous dye solution which may also contain salt and the dye is fixed after an alkali treatment, or in the presence of alkali, with or without the action of heat.

The dyes are also useful for printing, especially on cotton, but also for printing nitrogen-containing fibres, for example wool, silk or union fabrics containing wool.

It is advisable to rinse the dyeings and prints thoroughly with cold and hot water, with or without addition of a compound which acts as a dispersant and assists the diffusion of the non-fixed constituent.

In the Examples which follow, parts are by weight and temperatures are in degrees centigrade.

EXAMPLE 1

A neutral solution of 8.76 parts of the dye of the formula

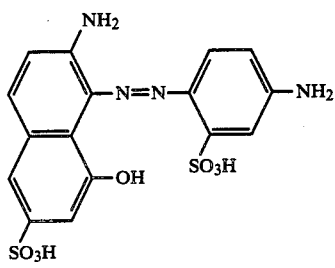

in 300 parts of water is prepared and 6.68 parts of sodium acetate are added. A solution of 5.75 parts of 2,4,6-trichloro-5-methylsulphonyl-pyrimidine in 30 parts of acetone is added to the preceding solution at room temperature, with vigorous stirring. After complete acylation, the solution is clarified by filtration, and the reactive dye formed is salted out with potassium chloride, filtered off and dried in vacuo at about 50° C.

The dye thus obtained dyes cotton by the exhaustion method in bluish red shades.

2,4,6-Trichloro-5-methylsulphonyl-pyrimidine, used as the reactive component in the above example, is prepared as follows: 1a.

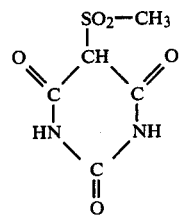

13 parts of barbituric acid are dissolved in a mixture of 250 parts by volume of water and 20 parts by volume of 10-normal sodium hydroxide solution at room temperature. The solution is cooled to 5°–10°; 17.1 parts of methanesulphochloride are added dropwise to the clear solution in the course of 40 minutes, whilst keeping the pH value at 12 by adding 2-normal sodium hydroxide solution. The reaction mixture, which is a pale suspension, is allowed to come to room temperature and is then left to stand for 15–20 hours. Thereafter, the pH is brought to 1 by adding 10 parts by volume of concentrated hydrochloric acid, the reaction mixture is then cooled to 5° and filtered, and the precipitate is washed with a small amount of cold water and is dried in vacuo at 60°. Yield: 21.5 parts (94%) of the sodium salt. Melting point: 346°/47° (decomposition).

Preparation of the free 5-methylsulphonyl-barbituric acid from its sodium salt.

10 g of moist Amberlite IR 140 ion exchanger are washed on a column with deionised water, until the wash water emerges clear, colourless and at pH 7. 250 mg of the sodium salt of 5-methylsulphonylbarbituric acid, dissolved in a small amount of warm water (at 30°–40°) are then applied to the column, and the latter is rinsed with water until the eluate has again reached pH 7. The aqueous solution is evaporated to dryness in vacuo at about 30°: colourless crystals, melting with decomposition at 262°, are obtained. Should the product still contain traces of the sodium salt (detectable by the yellow coloration of a flame), they can be removed by extracting the free compound from the sodium salt by means of acetone 1b.

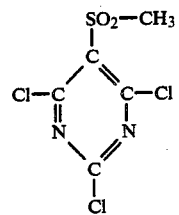

12.5 parts by volume of N,N-dimethylaniline are added slowly at room temperature to 125 parts by volume of phosphorus-(V) oxychloride. 22.8 parts of the compound obtained as described in 1a. (as the sodium salt, or a corresponding amount of the free acid) are added to the above solution at room temperature. The reaction mixture is heated and at about 55° a slow evolution of hydrogen chloride commences; the resulting suspension is refluxed for 15 to 20 hours. The turbid solution is then poured into water at 25°–28° and the mixture is stirred for 20 minutes. The resulting precipitate (17.6 parts) is air-dried and taken up on methylene chloride, the resulting solution is treated with charcoal and sodium sulphate and then clarified by filtration, and the filtrate is concentrated to dryness in a rotary evaporator.

17.3 parts of a solid are obtained. This material is dissolved in 100 parts by volume of toluene, the solution is treated with active charcoal, clarified by filtration and cooled, and the product is allowed to crystallise out. Ultimately, about 15.8 parts (~60.4% of theory) of a product, of which the main fraction has a melting point of 146°/147°, are obtained from a number of crystal fractions.

1c. The procedure described in Example 1a is repeated, except that equivalent amounts of ethanesulphonyl chloride, n-butanesulphonyl chloride, chloromethanesulphonyl chloride, dichloromethanesulphonyl chloride, β-ethoxyethanesulphonyl chloride and benzylsulphonyl chloride are used in place of 17.1 g of methanesulphonyl chloride; the following compounds are obtained:

sodium 5-ethylsulphonyl-barbiturate, melting point >360° (decomposition; 86% of theory);

sodium 5-n-butylsulphonyl-barbiturate, melting point >360° C. (decomposition; 97% of theory);

sodium 5-chloromethylsulphonyl-barbiturate, melting point >360° C. (decomposition; 56% of theory);

sodium 5-dichloromethylsulphonyl-barbiturate, melting point >360° C. (decomposition; 20% of theory);

sodium 5-β-ethoxyethylsulphonyl-barbiturate, melting point >360° C. (decomposition; 65% of theory); and sodium 5-benzylsulphonyl-barbiturate, melting point >360° C. (decomposition; 40% of theory).

1d. A solution of 25 g (1.43 mols) of 96% pure methanesulphonic acid anhydride in 25 ml of acetone is added dropwise to a solution of 11.9 g (0.09 mol) of barbituric acid in 200 ml of water and 18 ml of 10-normal sodium hydroxide solution at room temperature. The pH is kept at 11.5–12 by adding 30 ml of 5-normal sodium hydroxide solution. After stirring the reaction mixture for 4 hours at room temperature, the reaction has ended (the pH is constant). The resulting suspension is treated with 20 ml of concentrated hydrochloric acid (pH 1) and the resulting precipitate is filtered off. 17.7 g of sodium 5-methylsulphonyl-barbiturate (86% of theory) are obtained.

1e. The procedure described in Example 1b is repeated, except that in place of 22.8 g of sodium 5-methylsulphonyl-barbitutate, equivalent amounts of sodium 5-ethylsulphonyl-barbiturate, sodium 5-n-butylsulphonyl-barbiturate, sodium 5-chloromethylsulphonyl-barbiturate, sodium 5-dichloromethylsulphonyl-barbiturate, sodium 5-β-ethoxyethylsulphonyl-barbiturate or sodium 5-benzylsulphonyl-barbiturate are used; the following compounds are obtained:

5-ethylsulphonyl-2,4,6-trichloropyrimidine; melting point 135°–136° C.; yield 70% of theory; 5-n-butylsulphonyl-2,4,6-trichloropyrimidine; melting point 71°–72° C.; yield 54% of theory; 5-chloromethylsulphonyl-2,4,6-trichloropyrimidine; melting point 152°–153° C.; yield 69% of theory; 5-dichloromethylsulphonyl-2,4,6-trichloropyrimidine; melting point 150°–152° C.; 5-β-ethoxyethylsulphonyl-2,4,6-trichloropyrimidine; melting point 133°–134° C.; yield 42% of theory; and 5-benzylsulphonyl-2,4,6-trichloropyrimidine; melting point 160°–162° C.; yield 60% of theory.

1f. A solution of 2.6 g (0.01 mol) of the 5-methylsulphonyl-2,4,6-trichloropyrimidine obtained according to Example 1b, in 75 ml of phosphorus tribromide, is kept for 24 hours at an internal temperature of 115°–120° C. The phosphorus tribromide is then distilled off on a rotary evaporator and the solid residue is suspended in methylene chloride or benzene and filtered off. From benzene, the 5-methylsulphonyl-2,4,6-tribromopyrimidine obtained crystallises in the form of colourless crystals of melting point 206°–208° C.; yield 2.7 g=68.4% of theory.

1g. A suspension of 78.5 g (0.3 mol) of 5-methylsulphonyl-2,4,6-trichloropyrimidine and 240 g of 90% pure potassium fluorosulphinate in 1,250 ml of anhydrous xylene is warmed slowly. The evolution of $SO_2$ commences at 93° C. and has virtually ended at refluxing for 2 hours. The reaction is terminated by 18 hours' refluxing. The resulting pale brown suspension is clarified with animal charcoal at 70° C. and the solvent is stripped off on a rotary evaporator at 40° C. bath temperature. The residue distils, in a high vacuum, at 118°–125° C./0.03 mm Hg. 48 g of 5-methylsulphonyl-2,4,6-trifluoropyrimidine are obtained; melting point 103°–105° C. (yield 75% of theory).

EXAMPLE 2

A neutral solution of 8.93 parts of the dye of the formula

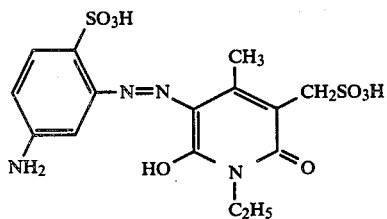

in 300 parts of water is prepared and 6.68 parts of sodium acetate are added. A solution of 5.75 parts of 2,4,6-trichloro-5-methylsulphonyl-pyrimidine in 30 parts of acetone is added to this solution at room temperature, with vigorous stirring. After complete acylation, the solution is clarified by filtration. The resulting reactive dye is salted out with potassium chloride, filtered off and dried in vacuo at about 50° C.

The dye thus obtained dyes cotton, by the pad-dyeing process, in greenish yellow shades.

Acylation of the amino group of the above dye with one equivalent of the pyrimidines listed below gives dyes which also dye cotton in greenish yellow shades: 5-ethylsulphonyl-2,4,6-trichloro-pyrimidine, 5-n-butylsulphonyl-2,4,6-trichloropyrimidine and 5-chloromethylsulphonyl-2,4,6-trichloro-pyrimidine.

EXAMPLE 3

A neutral solution of 15.04 parts of the dye of the formula

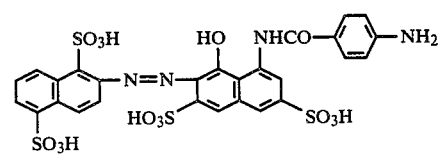

in water at room temperature is prepared and 5.75 parts of finely pulverised 2,4,6-trichloro-5-methylsulphonyl-pyrimidine are added. The pH of the reaction mixture is kept at between 5 and 7 by dropwise addition of 1-normal sodium hydroxide solution. When amino groups are no longer detectable, the dye solution is clarified by filtration and evaporated to dryness in vacuo at 50° to 60° C.

The dye thus obtained dyes cotton in bluish red shades.

The Table which follows lists further chromophores containing amino groups, which can be reacted with 2,4,6-trichloro-5-methylsulphonyl-pyrimidine to give reactive dyes and which dye cotton in the shades shown below.

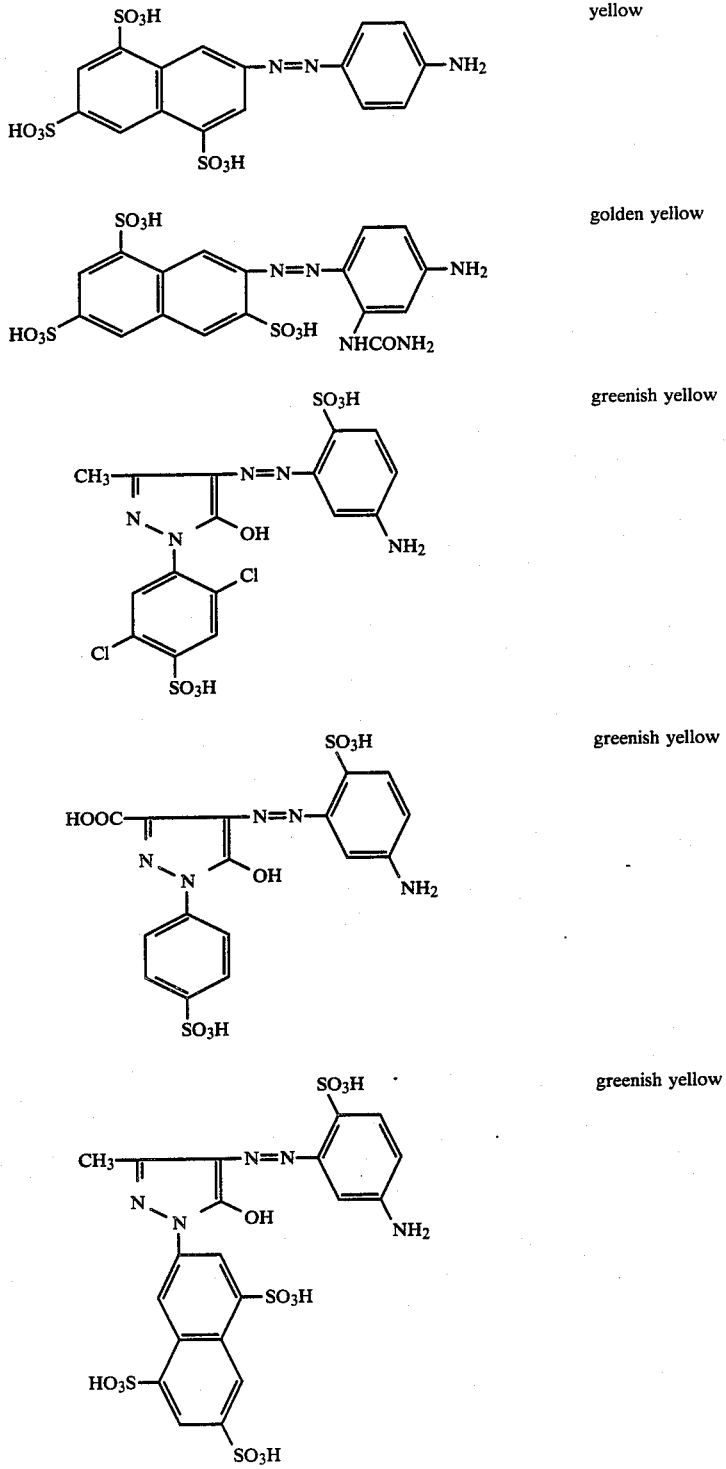

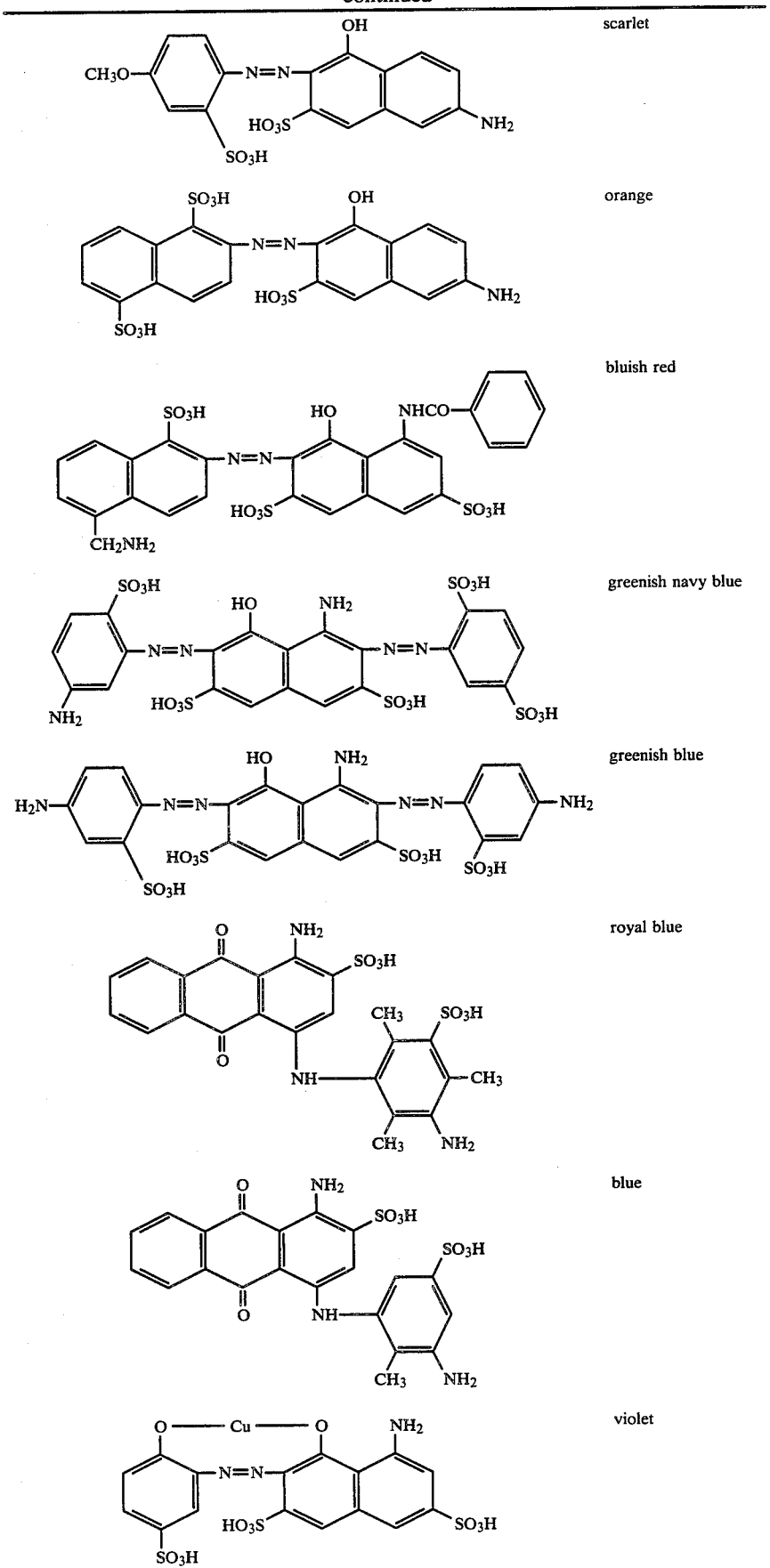

-continued
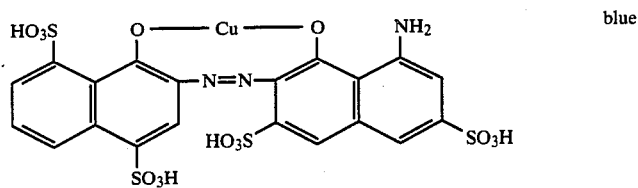
blue
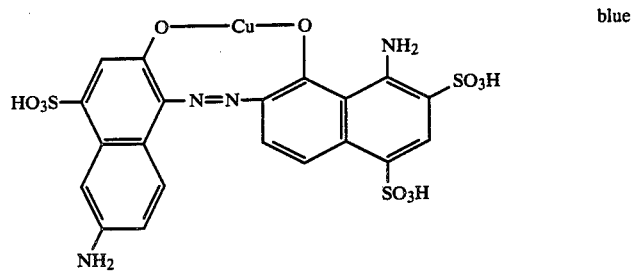
blue
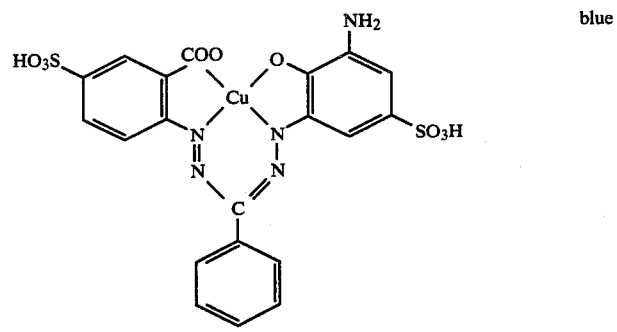
blue
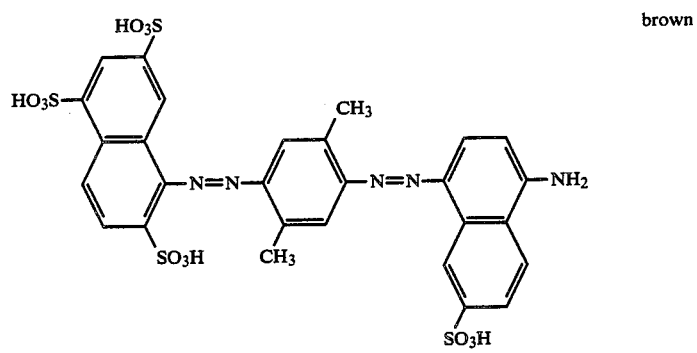
brown
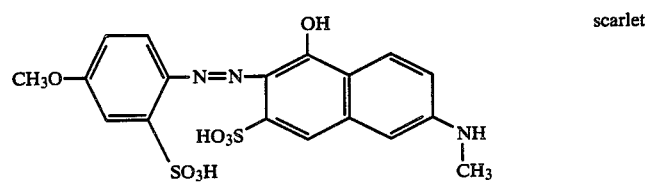
scarlet
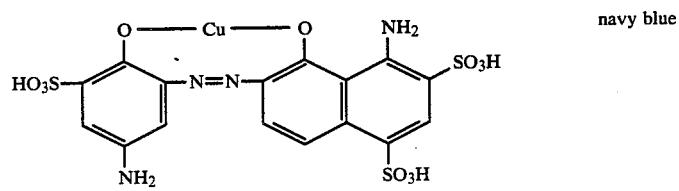
navy blue -continued

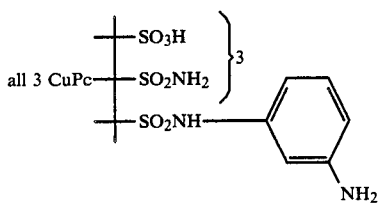 turquoise

EXAMPLE 4

A neutral solution of 3.76 parts of 2,4-diaminobenzenesulphonic acid in 200 parts of water is prepared and 6.6 parts of sodium acetate are added. A solution of 5.75 parts of 2,4,6-trichloro-5-methylsulphonyl-pyrimidine in 20 parts of acetone is then added to this solution at room temperature, with vigorous stirring. The condensation product of the formula

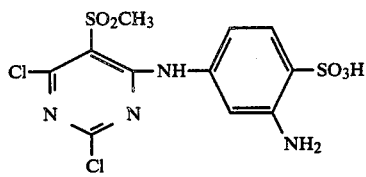

which is thus obtained in then diazotised in the usual manner and combined with a solution, rendered alkaline with sodium carbonate, of 1-(2′,5′-dichlorophenyl)-3-methyl-5-pyrazolone-4′-sulphonic acid.

The dye thus obtained dyes wool in greenish yellow shades.

If in place of the above pyrazolone an equivalent amount of the coupling components listed in column I of the Table which follows is used, dyes which dye wool in the shades shown in Column II are obtained.

| I | II |
|---|---|
| 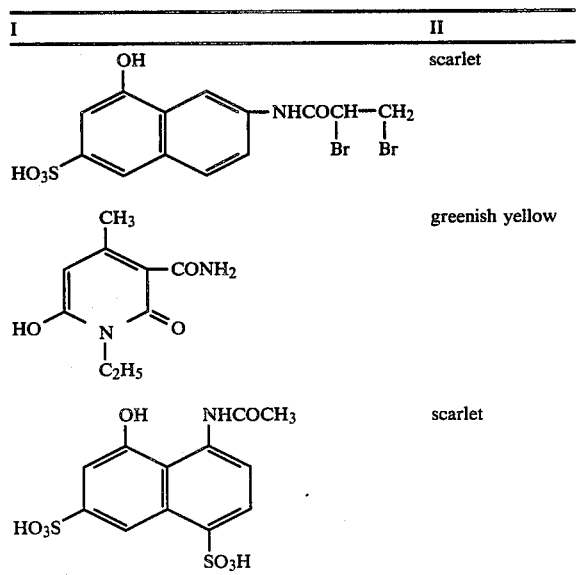 | scarlet<br><br>greenish yellow<br><br>scarlet<br><br>red |

EXAMPLE 5

A neutral solution of 5.45 parts of the dye of the formula

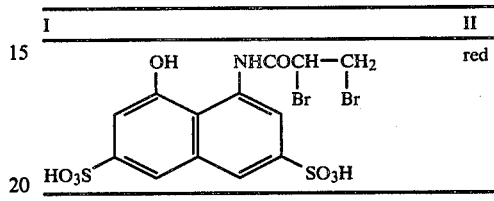

in 100 parts of water is prepared and 50 parts of ice are added. A solution of 2.12 parts of 2,4,6-trifluoro-5-methylsulphonyl-pyrimidine in 20 parts of acetone is then added to the ice-cold solution, with vigorous stirring.

The pH of the solution is then restored to 7 by dropwise addition of about 11 parts of 1-normal sodium hydroxide solution. After complete acylation of the amino group, a neutral solution of 1.73 parts of metanilic acid in 50 parts of water is added to the solution of the difluoro compound, and the combined solution is warmed to 30°–35° C. and kept at a pH of between 6 and 7 by dropwise addition of 1-normal sodium hydroxide solution. As soon as the second condensation has ended, the monofluorotriazine dye formed is salted out with potassium chloride and filtered off. The dye paste is mixed with a concentrated, aqueous solution of 0.5 part of disodium hydrogen phosphate and is dried in vacuo at 40° to 50° C.

The dye thus obtained dyes cotton in golden yellow shades.

EXAMPLE 6

A neutral solution of 5.53 parts of the dye of the formula

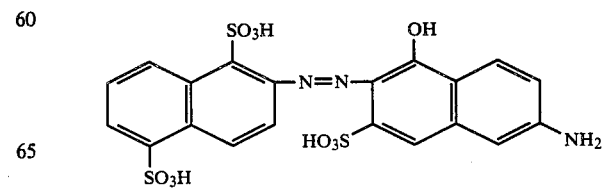

in 100 parts of water is prepared and 50 parts of ice are added. A solution of 2.12 parts of 2,4,6-trifluoro-5-methylsulphonylpyrimidine in 20 parts of acetone is then added to the ice-cold solution, with vigorous stirring.

The pH of the solution is restored to 7 by dropwise addition of about 11 parts of 1-normal sodium hydroxide solution. After complete acylation of the amino group, 1.07 parts of o-toluidine are added to the solution of the difluorotriazine dye, and the combined solution is warmed to 30°–35° C. and kept at a pH of between 6 and 7 by dropwise addition of about 9 parts of 1-normal sodium hydroxide solution.

After the condensation has taken place, the dye formed is salted out by adding 25% by volume of sodium chloride and is filtered off. The dye paste is buffered with a concentrated aqueous solution of 0.5 part of disodium hydrogen phosphate and is dried in vacuo at 40° to 50° C.

The dye thus obtained dyes cotton in orange shades.

EXAMPLE 7

A solution of 2.12 parts of 2,4,6-trifluoro-5-methylsulphonyl-pyrimidine in 20 parts of acetone is added to a neutral solution of 1.73 parts of orthanilic acid in 100 parts of ice-water, with vigorous stirring, and the pH of the solution is restored to 7 by dropwise addition of about 10 parts of 1-normal sodium hydroxide solution.

A neutral solution of 4.38 parts of the dye of the formula

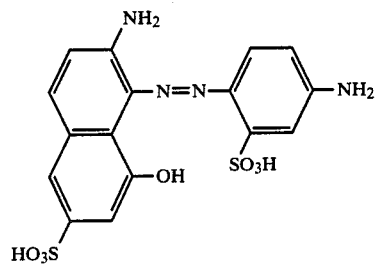

is then added to the neutral solution of the primary condensation product, obtained above, the reaction mixture is warmed to 30°–35° C., and the pH of the solution is kept at between 6 and 7 by dropwise addition of about 10 parts of 1-normal sodium hydroxide solution.

After the acylation has taken place, the monofluorotriazine dye formed is salted out with sodium chloride and filtered off. The dye paste is mixed with a concentrated aqueous solution of 0.5 part of disodium hydrogen phosphate and dried in vacuo at 40° to 50° C.

The dye thus obtained dyes cotton in bluish red shades.

Condensation of 2,4,6-trifluoro-5-methylsulphonylpyrimidine with the dyes, containing amino groups, shown in column I, and the amines shown in column II, by the procedure described in Examples 5 to 7, gives further monofluorotriazine dyes which dye cotton in the shades shown in column III.

| I | II | III |
|---|---|---|
| [Structure: 1-hydroxy-6-amino-naphthalene-3-sulfonic acid azo-coupled with 4-methoxy-2-sulfophenyl] | Metanilic acid | scarlet |
| [Structure: 1-hydroxy-6-amino-naphthalene-3-sulfonic acid azo-coupled with 4-methoxy-2-sulfophenyl] | N—Ethylaniline | scarlet |
| [Structure: 1-hydroxy-6-amino-naphthalene-3-sulfonic acid azo-coupled with 4-methoxy-2-sulfophenyl] | p-Toluidine | scarlet |
| [Structure: pyridone dye with SO$_3$H, NH$_2$, CH$_3$, H$_2$NCO, N—C$_2$H$_5$] | Orthanilic acid | greenish yellow |
| [Structure: pyridone dye with SO$_3$H, NH$_2$, CH$_3$, H$_2$NCO, N—C$_2$H$_5$] | 2-Naphthylamine-6-sulphonic acid | greenish yellow |

-continued

| I | II | III |
|---|----|-----|
| (structure: pyridone with CH₃, H₂NCO, OH, N-C₂H₅, azo to benzene with SO₃H and NH₂) | p-Aminobenzoic acid | greenish yellow |
| (structure: pyridone with CH₃, HO₃SCH₂, OH, N-C₂H₅, azo to benzene with SO₃H and NH₂) | p-Aminoacetanilide | greenish yellow |
| (structure: pyrazolone with CH₃, azo to naphthalene bearing two SO₃H groups, coupled to benzene with SO₃H, OH, NH₂) | o-Toluidine | yellow |

-continued

| I | II | III |
|---|---|---|
| (structure: sulfophenyl-amine with azo to CH3/OH/N-N linked naphthalene disulfonic acid) | p-Chloroaniline | yellow |
| (structure: sulfophenyl-amine with azo to CH3/OH/N-N linked naphthalene disulfonic acid) | o-Anisidine | yellow |
| (structure: sulfophenyl-amine with azo to CH3/OH/N-N linked naphthalene disulfonic acid) | Ammonia | yellow |

-continued

| I | II | III |
|---|---|---|
| (pyrazolone structure with HOOC, N=N, OH, SO₃H groups, and aniline-SO₃H/NH₂ substituents) | Aniline | yellow |
| (same pyrazolone structure) | Morpholine | yellow |
| (same pyrazolone structure) | N—Ethylaniline | yellow |

-continued

| I | II | III |
|---|---|---|
| (structure: HOOC-C(=N-NH-C6H4-SO3H)-C(OH)=N-N=... benzene with SO3H and NH2) | Metanilic acid | yellow |
| (naphthalene with OH, SO3H, N=N-C6H3(OCH3)(SO3H), NHCH3) | Metanilic acid | scarlet |
| (naphthalene with SO3H, HO3S, N=N-C6H3(SO3H)(NHCONH2)(NH2)) | o-Toluidine | golden yellow |
| (naphthalene with SO3H, HO3S, N=N-C6H3(SO3H)(NHCONH2)(NH2)) | Taurine | golden yellow |
| (naphthalene with OH, HO3S, SO3H, N=N-naphthalene(SO3H)(NH2)) | N—Methylaniline | orange |

-continued
| I | II | III |
|---|---|---|
| 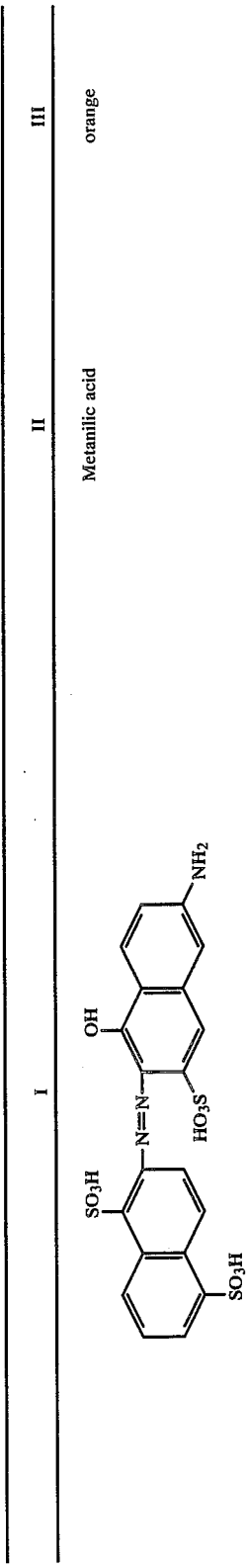 | Metanilic acid | orange |
|  | p-Anisidine | orange |
| 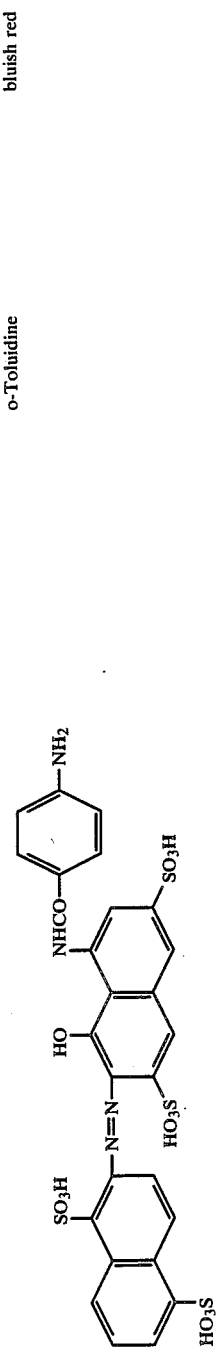 | o-Toluidine | bluish red |
|  | Orthanilic acid | blue |

-continued
| I | II | III |
|---|---|---|
| 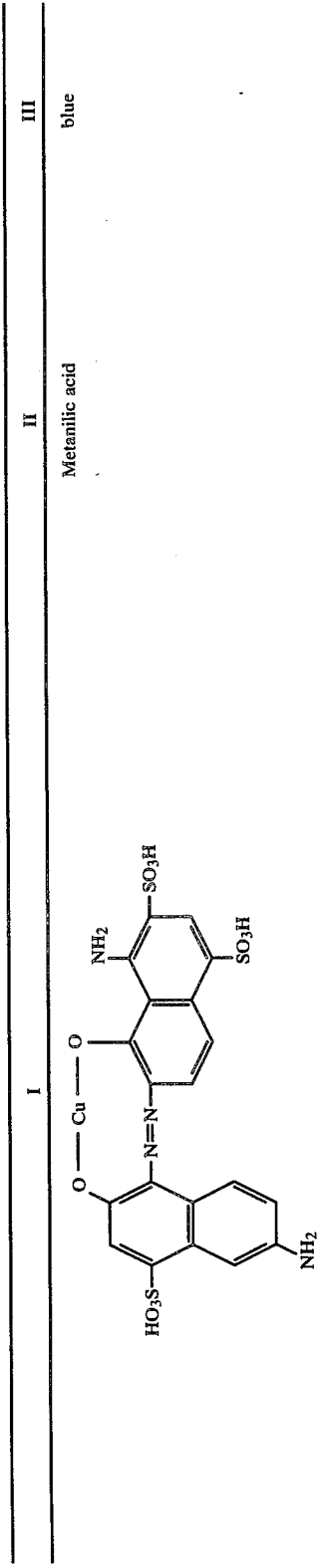 | Metanilic acid | blue |
| 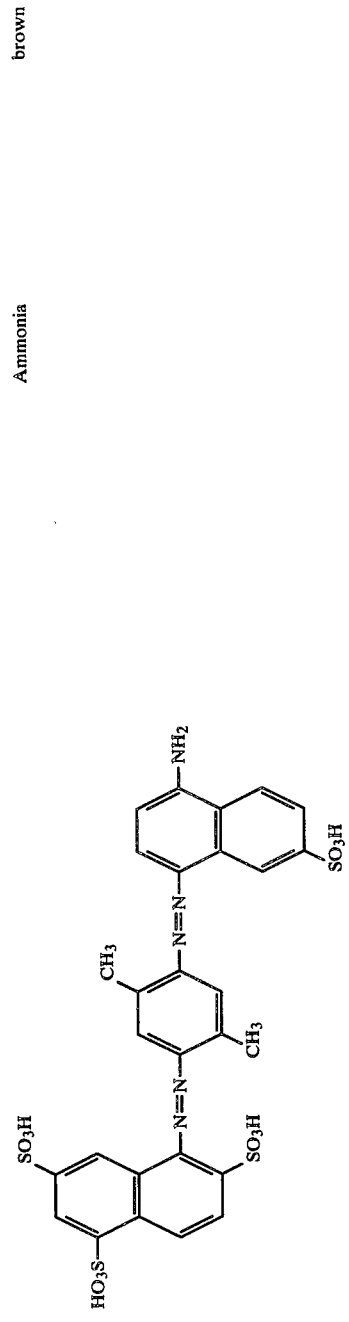 | Ammonia | brown |
| 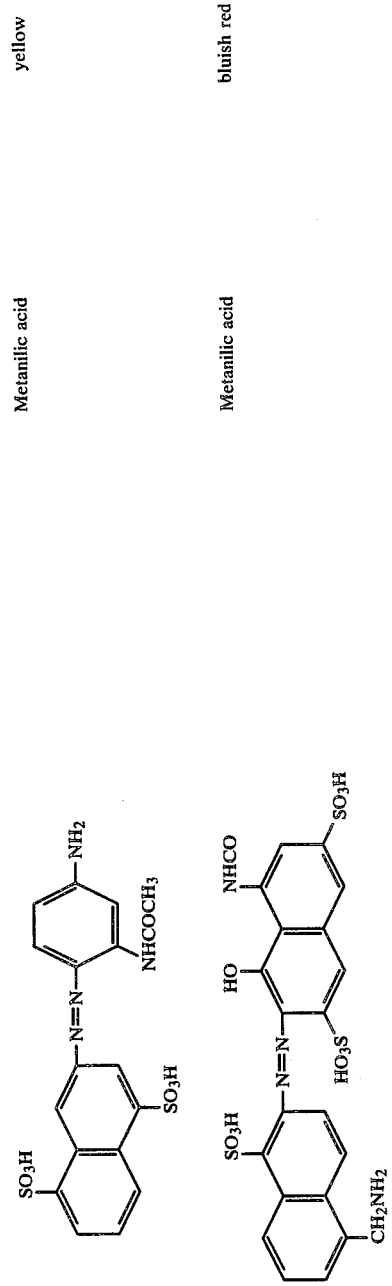 | Metanilic acid | yellow |
| | Metanilic acid | bluish red |

-continued

| I | II | III |
|---|---|---|
| (structure) | o-Toluidine | dark blue |
| (structure) | Sulphanilic acid | greenish navy blue |
| (structure) | Metanilic acid | greenish blue |
| (structure) | Ammonia | violet |
| (structure) | o-Toluidine | blue |

| I | II | III |
|---|---|---|
| [structure: Cu-complexed azo dye with NH₂, SO₃H groups on naphthalene and phenyl rings] | 2-Aminotoluene-4-sulphonic acid | reddish blue |
| [structure: Cu-complexed bis-azo dye with SO₃H, COO, phenyl groups] | Orthanilic acid | blue |
| [structure: anthraquinone with NH₂, SO₃H, NH-phenyl-SO₃H substituents] | Ethanolamine | greenish blue |
| [structure: anthraquinone with NH₂, SO₃H, NH-(trimethyl-SO₃H-phenyl) substituents] | 4-Aminosalicylic acid | royal blue |

-continued
| I | II | III |
|---|---|---|
| 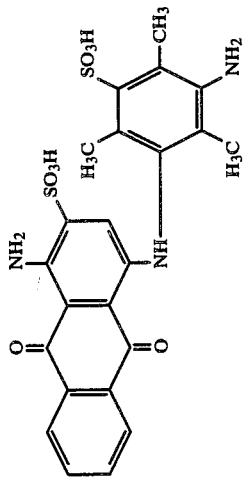 | 4-Amino-phenylurea | royal blue |
| 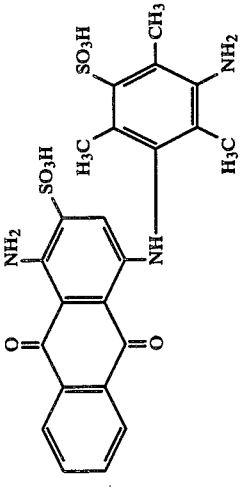 | 2-Chloroaniline | royal blue |
| 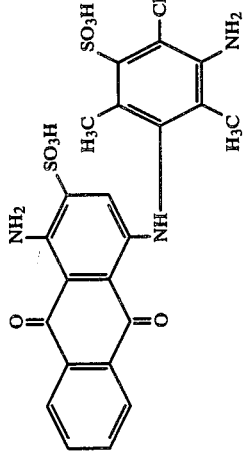 | 3-Amino-phenylurea | yellow |
| 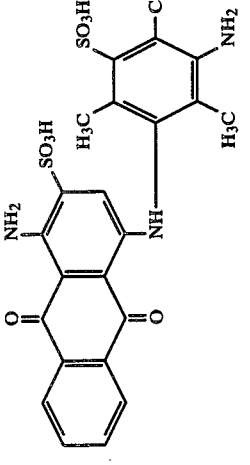 | o-Toluidine | bluish red |

-continued

| I | II | III |
|---|---|---|
| (structure: naphthalene with OH, SO₃H, HO₃S, N=N azo group connecting to naphthalene with NH, triazine with Cl, linked to phenyl-NH₂/SO₃H) | o-Toluidine | bluish red |
| (structure: naphthalene with NHCO-phenyl, OH, SO₃H, HO₃S, N=N azo to phenyl with SO₃H and NH₂) | Metanilic acid | bluish red |
| all 3-CuPc{SO₃H / SO₂NH₂ / SO₂NH—phenyl—NH₂}₃ | 2-Naphthylamine-6-sulphonic acid | turquoise |
| all 3-CuPc{SO₃H / SO₂NH₂ / SO₂NH—phenyl(SO₃H)—NH₂}₂,₈ | 2-Ethylaniline | turquoise |

| I | II | III |
|---|---|---|
|  | Metanilic acid | red |
|  | Orthanilic acid | yellow |
|  | Metanilic acid | yellow |
|  | Metanilic acid | blue |
|  | Ammonia | yellow |

-continued
| I | II | III |
|---|---|---|
| 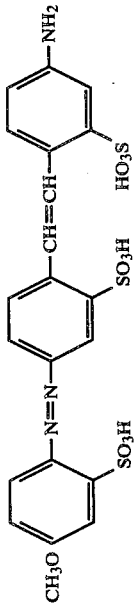 | 3-Aminotoluene | yellow |
| 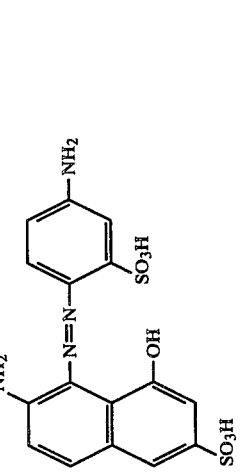 | 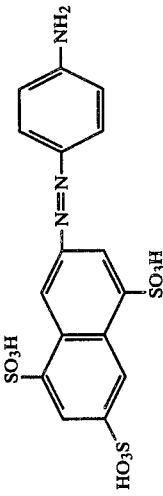 | bluish red |
| 2 equivalents of | 1 equivalent of p-phenylenediamine | yellow |

DYEING METHOD I 2 parts of the dye obtained according to Example 2 are dissolved in 100 parts of water, with addition of 0.5 part of sodium m-nitrobenzenesulphonate. A cotton fabric is impregnated with the resulting solution so as to give wet pick-up of 75% and is then dried.

Thereafter, the fabric is impregnated with a solution, at 20° C., which contains 3 to 10 grams of sodium hydroxide and 250 grams of sodium chloride per liter, and is squeezed off to 75% wet pick-up, and the dyeing is steamed for 30 to 60 seconds at 100° to 101° C., rinsed, soaped for quarter of an hour in an 0.3% strength boiling solution of a nonionic detergent, rinsed and dried.

DYEING METHOD II 2 parts of the dye obtained according to Example 1 are dissolved in 100 parts of water. This solution is added to 1,900 parts of water at 40° C., 60 to 120 parts of sodium chloride are added, and 100 parts of a cotton fabric are introduced into this dyebath.

After 30 minutes, 10 to 40 parts of calcined sodium carbonate are added and the temperature is kept at 40° C. for 30 to 60 minutes. The dyeing is then rinsed, soaped for 15 minutes with an 0.3% strength boiling solution of a nonionic detergent, rinsed and dried.

DYEING METHOD III 1.5 parts of the dye obtainable by the method of Example 4 and shown as the first dye in the Table are dissolved in 4,000 parts of water and 4 parts of ammonium sulphate, 5 parts of crystalline sodium sulphate, 1 part of 80% strength acetic acid and 1 part of an adduct of oleylamine with ethylene oxide, prepared as described below, are added. 100 parts of well-wetted chlorinated wool are introduced into the resulting dyebath at 30°. The dyebath is brought to the boil in the course of 30 minutes and the wool is dyed for 50 minutes at the boil. The bath is then cooled to 80° and brought to a pH value of 8.5 by adding ammonia. The wool is dyed in this bath for a further 15 minutes and is finally rinsed with cold water and dried. The wool proves to be dyed in a washfast brilliant yellow shade of good lightfastness. Preparation of the ethylene oxide adduct:

1 part of finely divided sodium is added to 100 parts of technical oleylamine and the mixture is heated to 140°, after which ethylene oxide is introduced at 135° to 140°. As soon as the ethylene oxide is absorbed rapidly, the reaction temperature is lowered to 120° to 125° and the introduction of the ethylene oxide is continued until 113 parts thereof have been absorbed. The reaction product thus obtained gives a virtually clear solution in water.

PRINTING METHOD 2 parts of the dye prepared according to Example 2 are sprinkled, with rapid stirring, into 100 parts of a stock thickener containing 45 parts of 5% strength sodium alginate thickener, 32 parts of water, 20 parts of urea, 1 part of sodium m-nitrobenzenesulphonate and 2 parts of sodium carbonate.

A cotton fabric is printed with the resulting printing paste on a roller printing machine, and the resulting printed fabric is dried and steamed for 2 to 8 minutes at 100° C. in saturated steam. The printed fabric is then thoroughly rinsed in cold and hot water, whereby the constituents which have not been fixed chemically can very easily be removed from the fibres, and is then dried.

What is claimed is:

1. A dye of the formula

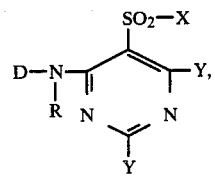

(1)

in which D is the radical of a monoazo, polyazo or metal complex azo dye, R is hydrogen or a low molecular weight alkyl group which may be substituted by halogen or hydroxyl, X is alkyl or alkenyl which may be substituted by halogen, alkoxy or aryl, one Y is a halogen atom and the other Y is halogen, alkyl which may be substituted by halogen, alkenyl which may be substituted by halogen or is a nitro, cyano, carboxyl, carboxylic acid ester, carboxamide, sulfonamide, sulfo or sulfonic acid ester group, amino, hydroxylamino, hydrazino, phenylhydramino, sulfophenylhydrazino, alkylamino or dialkylamino which may be substituted in the alkyl moiety by hydroxy, alkoxy, chloro, phenyl, sulfato or sulfo, cyclohexylamino, N-alkyl-N-phenylamino, N-sulfomethyl-N-phenylamino, phenylamino which may be substituted by alkyl, alkoxy, chloro, amino, hydroxy, nitro, carboxy, acetylamino, ureido, sulfomethyl or sulfo, napthylamino which may be substituted by amino, hydroxy or sulfo, pyridylamino, benzthiezolylamino, quinolylamino, pyrimidylamino, morpholine, piperidino, piperazino, hydroxy, alkoxy which may be substituted by alkoxy, alkoxyalkoxy or carboxy, phenoxy which may be substituted by chloro, nitro, carboxy or sulfo, naphthoxy which may be substituted by sulfo, mercapto, alkylthio which may be substituted by cathoxy, or is thiouraide, phenylthio which may be substituted by $C_{1-4}$-alkyl, $C_{1-4}$-alkoxy, $C_{1-6}$-acylamino, amino, alkylamino, dialkylamino, the ureido, hydroxyl, sulfo or carboyxl group, or halogen, or is napthylthio which may be substituted by $C_{1-4}$-alkyl, $C_{1-4}$-alkoxy, $C_{1-6}$-acylamino, amino, alkylamino, dialkylamino, the ureido, hydroxyl, sulfo or carboxyl group or halogen.

2. A dye according to claim 1, in which D, R and X are as defined in claim 1, one Y is halogen and the other Y is halogen, amino, hydroxylamino, hydrazino, phenylhydrazino, sulfophenylhydrazino, alkylamino or dialkylamino which may be substituted in the alkyl moiety by hydroxy, alkoxy, chloro, phenyl, sulfato, or sulfo, cyclohexylamino, N-alkyl-N-phenylamino, N-sulfomethyl-N-phenylamino, phenylamino which may be substituted by alkyl, alkoxy, chloro, hydroxy, nitro, carboxy, acetylamino, ureido, sulfomethyl or sulfo, naphthylamino which may be substituted by hydroxy or sulfo, pyridylamino, - benzthiazolylamino, quinolinylamino, pyrimidylamino, morpholino, piperidino, piperzino, hydroxy, alkoxy which may be substituted by alkoxy, alkoxylakoxy or carboxy, phenoxy which may be substituted by chloro, nitro, carboxy or sulfo, naphthoxy which may be substituted by sulfo, mercapto, alkylthio which may be substituted by carboxy, or is chloureido, phenylthio or naphthylthio.

3. A dye according to claim 1, in which D, R and X are as defined in claim 1, one Y is halogen and the other Y is halogen, amino, hydroxylamino, $—NH_2$, hydrazino, phenylhydrazino, sulfophenylhydrazino, alkylamino or dialkylamino which may be substituted in the alkyl moiety by hydroxy, alkoxy, chloro, phenyl, sulfato, or sulfo, cyclohexylamino, N-alkyl-N-phenylamino, N-sulfomethyl-N-phenylamino, phenylamino which may be substituted by alkyl, alkoxy, chloro, hydroxy, nitro, carboxy, acetylamino, ureido, sulfomethyl or sulfo, naphthylamino which may be substituted by hydroxy or sulfo, pyridylamino, benzthiazolylamino, quinolinylamino, pyrimidylamino, morpholino, piperidine, piperazine, alkoxy which may be substituted by alkoxy, alkoxyalkoxy or carboxy, phenoxy which may be substituted by chloro, nitro, carboxy or sulfo, naphthoxy which may be substituted by sulfo, alkylthio which may be substituted by carboxy, or is thioureido, phenylthio or naphthylthio.

4. A dye according to claim 1, of the formula

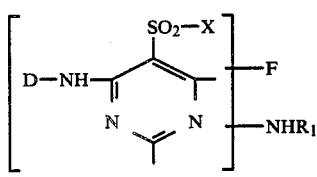

(2a)

in which D and X are as defined in claim 1 and $R_1$ is hydrogen, alkyl which may be substituted by hydroxy, alkoxy, chloro, phenyl, sulfato or sulfo, cyclohexyl, phenyl which may be substituted by alkyl, alkoxy, chloro, hydroxy, nitro, carboxy, acetylamino, ureido, sulfomethyl or sulfo, or naphthyl which may be substituted by hydroxy or sulfo.

5. A dye according to claim 1, in which D and X are as defined in claim 1, R is hydrogen or alkyl having 1 to 4 carbon atoms and both Y are halogen and can be identical or different.

6. A dye according to claim 5, in which D, R and Y are as defined in claim 5 and X is an alkyl radical which can be substituted by halogen, alkoxy or aryl.

7. A dye according to claim 5, in which D, R and X are as defined in claim 5 and both Y are halogen and are identical.

8. A dye according to claim 7, in which D and R are as defined in claim 7, X is low molecular weight alkyl and both Y are chlorine atoms.

9. A dye according to claim 8, of the formula

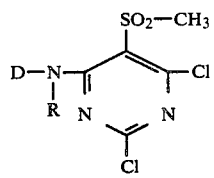

(2)

in which D and R are as defined in claim 8.

10. A dye according to claim 9, in which D is as defined in claim 9 and R is hydrogen.

11. A dye according to claim 10, in which D is the radical of a monoazo or disazo dye.

12. A dye according to claim 10, in which D is the radical of a metal complex azo dye.

13. A dye according to claim 11, of the formula

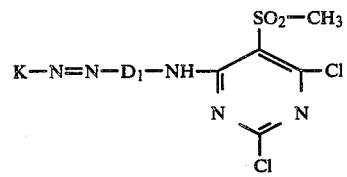

(3)

in which $D_1$ is the radical of a diazo component of the benzene or naphthalene series and K is the radical of a coupling component of the benzene or naphthalene series or of the heterocyclic series.

14. A dye according to claim 1, in which the radical D contains a group which confers solubility in water.

15. A dye according to claim 4, in which D is the radical of a monoazo or disazo dye.

16. A dye according to claim 4, in which D is the radical of a metal complex azo dye.

* * * * *